(12) United States Patent
Morinaga et al.

(10) Patent No.: US 8,670,918 B2
(45) Date of Patent: Mar. 11, 2014

(54) METHOD OF CONTROLLING AUTOMOBILE-MOUNT DIESEL ENGINE AND THE AUTOMOBILE-MOUNT DIESEL ENGINE

(75) Inventors: Shinichi Morinaga, Hiroshima (JP);
Daisuke Shimo, Hiroshima (JP);
Hiroshi Hayashibara, Hiroshima (JP);
Kenji Tanimura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 282 days.

(21) Appl. No.: 13/167,577

(22) Filed: Jun. 23, 2011

(65) Prior Publication Data
US 2011/0320108 A1 Dec. 29, 2011

(30) Foreign Application Priority Data

Jun. 29, 2010 (JP) ................................ 2010-147534
Apr. 14, 2011 (JP) ................................ 2011-090027

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ........................... 701/108; 701/103; 701/105

(58) Field of Classification Search
USPC .......... 701/103, 105, 108, 110; 123/472, 478, 123/568.21, 568.26, 681
See application file for complete search history.

(56) References Cited

U.S. PATENT DOCUMENTS

| 6,964,256 | B2 * | 11/2005 | Kataoka et al. | 123/295 |
|---|---|---|---|---|
| 6,978,599 | B2 * | 12/2005 | Nishiyama et al. | 60/285 |
| 6,994,077 | B2 * | 2/2006 | Kobayashi et al. | 123/568.11 |
| 7,270,118 | B2 * | 9/2007 | Yamaoka et al. | 123/672 |
| 7,640,094 | B2 * | 12/2009 | Ishikawa et al. | 701/105 |
| 7,677,222 | B2 * | 3/2010 | Ishikawa | 123/299 |
| 7,715,975 | B2 * | 5/2010 | Yamaoka et al. | 701/103 |
| 7,729,843 | B2 * | 6/2010 | Ishikawa | 701/103 |
| 2009/0070002 | A1 * | 3/2009 | Ishikawa | 701/103 |
| 2009/0118978 | A1 | 5/2009 | Tanabe et al. | |
| 2009/0143959 | A1 * | 6/2009 | Yamaoka et al. | 701/108 |
| 2012/0016571 | A1 * | 1/2012 | Nada | 701/104 |

FOREIGN PATENT DOCUMENTS

| JP | 2003286880 A | * 10/2003 | ............. F02D 41/04 |
|---|---|---|---|
| JP | 2007-162544 A | 6/2007 | |
| JP | 2009191802 A | * 8/2009 | |

* cited by examiner

*Primary Examiner* — Stephen K Cronin
*Assistant Examiner* — Joseph Dallo
(74) *Attorney, Agent, or Firm* — Alleman Hall McCoy Russell & Tuttle LLP

(57) ABSTRACT

This disclosure provides a method of controlling a diesel engine, which includes executing a premix combustion pattern fuel injection containing one or more injections at a first timing, while introducing an amount of EGR gas according to an operating condition of the engine into a cylinder, when an engine load is low, to operate in a premix combustion mode, executing a diffusion combustion pattern fuel injection containing one or more injections at a second timing that is later than the first timing, when the engine load is high, to operate in a diffusion combustion mode, and executing a diffusion combustion pattern fuel injection at a third timing that is later than the second timing, while introducing the amount of EGR gas according to the operating condition of the engine into the cylinder, when shifting from the diffusion combustion mode to the premix combustion mode with a decrease in engine load.

15 Claims, 10 Drawing Sheets

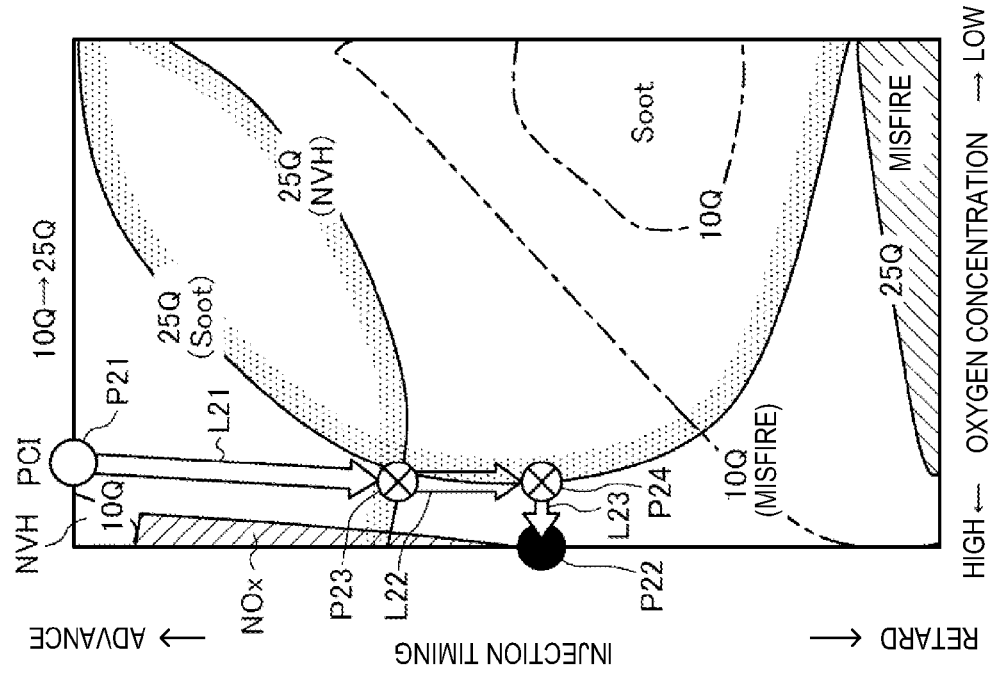
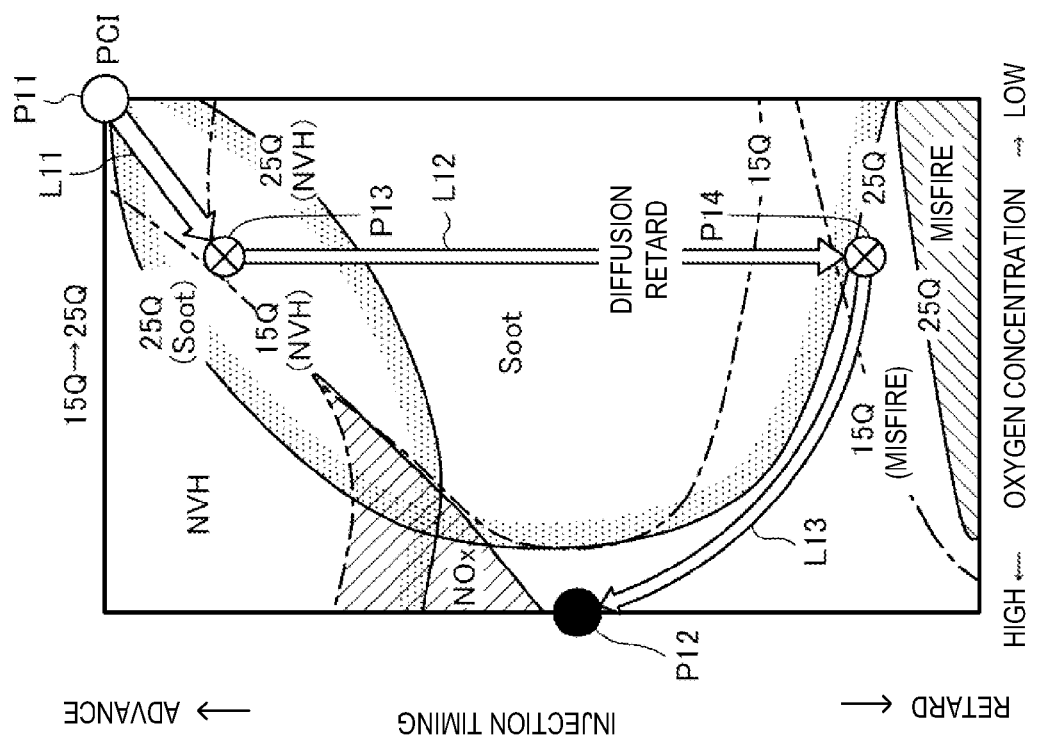

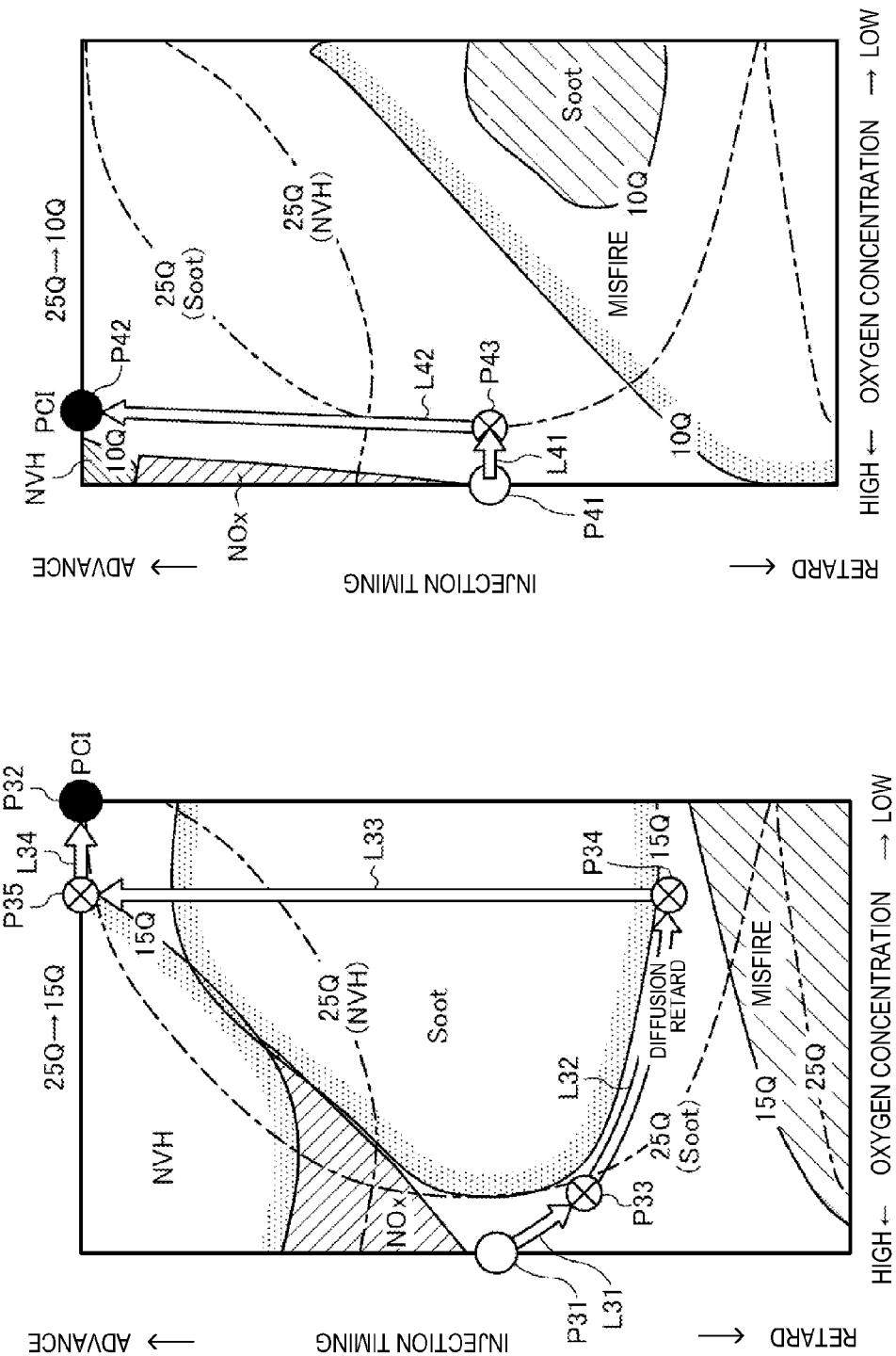

METHOD OF CONTROLLING AUTOMOBILE-MOUNT DIESEL ENGINE AND THE AUTOMOBILE-MOUNT DIESEL ENGINE

BACKGROUND

The present invention relates to an automobile-mount diesel engine and, more particularly to a diesel engine that is operated while switching between a premix combustion mode and a diffusion combustion mode.

Conventionally, diesel engines which carry out a switching control of combustion modes of fuel within an engine cylinder or cylinders according to an engine load are known. As the combustion modes of fuel, there are a diffusion combustion mode in which the fuel is combusted while injecting the fuel into a cylinder and a premix combustion mode in which the fuel is mixed within the cylinder before the fuel is lit. When the engine is under a high load, the diffusion combustion mode is used, and when the engine is under a low load, the premix combustion mode is used.

For example, JP2007-162544A discloses, in order to suppress generation of nitrogen oxide (NOx), soot, and noise (NVH: Noise Vibration Harshness) while smoothening the switching of the combustion modes, that a timing and amount of fuel being injected into a cylinder, and an oxygen concentration within the cylinder are continuously varied when shifting the combustion mode. Particularly, in the control disclosed in JP2007-162544A, during a transient state of the shifting of the combustion mode, a shift course from a fuel injection timing and an oxygen concentration before the shift to a fuel injection timing and an oxygen concentration after the shift is set so that generating amounts of NOx, NVH, and soot do not exceed tolerance limits, respectively. In addition, both the fuel injection timing and the oxygen concentration are changed gradually in accordance with the course.

However, depending on conditions upon the switching of the combustion mode, for example, if a difference of the oxygen concentrations within the cylinder before and after the switching is large, when both the fuel injection timing and the oxygen concentration are changed continuously, the oxygen concentration within a combustion chamber may become superfluous and the combustion noise (i.e., NVH) may exceed the tolerance limit, or the oxygen concentration within the combustion chamber may become thinner and the generation of soot may exceed the tolerance limit. That is, even if any shift course is set under the premise where both the fuel injection timing and the oxygen concentration are changed continuously, at least one of NVH and exhaust emission exceeds the tolerance limit and, thus, a shift course where both of them are avoided may be unable to be set. In this case, there is a problem in continuously changing both the fuel injection timing and the oxygen concentration as disclosed in JP2007-162544A.

SUMMARY

The present invention is made in view of the above situations and provides an improved automobile-mount diesel engine in which, when shifting a combustion mode between a premix combustion mode and a diffusion combustion mode, both of NVH and exhaust emission are certainly avoided to exceed their tolerance limits.

The inventors have configured the engine so that, when shifting the combustion mode between the premix combustion mode and the diffusion combustion mode, a fuel injection timing, which is relatively high in control flexibility, among the fuel injection timing and an oxygen concentration inside a cylinder, is changed discontinuously.

That is, when shifting from the premix combustion mode to the diffusion combustion mode, without gradually retarding the fuel injection timing from a timing in the premix combustion mode (i.e., a first timing that is earlier than an injection timing in the diffusion combustion mode) toward an injection timing in the diffusion combustion mode (i.e., a second timing), the fuel injection timing is jumped (in other words, discontinuously changed) to a third timing that is later than the injection timing in the diffusion combustion mode and, after that, the injection timing is changed back toward the second timing according to a change in the oxygen concentration within the cylinder.

Moreover, when shifting from the diffusion combustion mode to the premix combustion mode, without gradually advancing the fuel injection timing from the second timing that is the timing in the diffusion combustion mode to the first timing that is the timing in the premix combustion mode, the fuel injection timing is changed at a third timing that is later than the second timing according the change in the oxygen concentration within the cylinder. Further, when the oxygen concentration within the cylinder changes to a predetermined oxygen concentration state (in other words, an oxygen concentration state where the limit of NVH can be avoided even if the mode is changed to the premix combustion mode in this state), the fuel injection timing is jumped (in other words, changed discontinuously) to the first timing that is the injection timing in the premix combustion mode.

Particularly, according to one aspect of the present invention, a diesel engine disclosed herein includes an engine body being mounted in an automobile and supplied with fuel mainly containing diesel fuel, and for selectively operating in a premix combustion mode for a low load or in a diffusion combustion mode for a high load, an injection control module for controlling an injection of the fuel into a cylinder through a fuel injection valve according to the combustion mode, and an EGR amount control module for adjusting an EGR gas amount into the cylinder.

When the engine body operates in the premix combustion mode, the injection control module executes a fuel injection of a premix combustion pattern containing one or more injections at a first timing where a pressure within the cylinder is relatively low, and when the engine body operates in the diffusion combustion mode, the injection control module executes a fuel injection of a diffusion combustion pattern containing one or more injections at second timing that is later than the first timing. The EGR amount control module executes a control for introducing an amount of EGR gas into the cylinder according to an operating condition of the engine body, at least in the premix combustion mode and when shifting from the premix combustion mode to the diffusion combustion mode. When shifting from the premix combustion mode to the diffusion combustion mode with an increase in the load of the engine body, the injection control module also switches the fuel injection pattern from the premix combustion pattern to the diffusion combustion pattern and executes the fuel injection of the diffusion combustion pattern at a third timing that is later than the second timing and, after that, the injection control module executes a transition control in which the third timing is changed toward the second timing according to a change in an oxygen concentration within the cylinder.

Here, when two or more fuel injections are contained in the premix combustion pattern and the diffusion combustion pattern, the first timing, the second timing, and the third timing as the fuel injection timings may be set with respect to an injection representing the injection mode concerned among the two or more fuel injections (for example, a fuel injection which contributes most to a torque generation of the engine (that is, a main injection)).

Particularly, the phrase "executing the diffusion combustion pattern at the second timing that is later than the first timing" as used herein means that the timing of the main injection of the diffusion combustion pattern is retarded later than the timing of the main injection of the premix combustion pattern. In addition, the phrase "setting the timing of the diffusion combustion pattern to the third timing that is later than the second timing" as used herein means that the timing of the main injection of the diffusion combustion pattern is retarded later than the main injection which is carried out at the second timing.

Furthermore, the phrase "changing the timing of the diffusion combustion pattern (which was set to the third timing) toward the second timing according to the change in the oxygen concentration within the cylinder" includes changing the timing gradually from the third timing toward the second timing, as well as includes changing the timing to jump it from the third timing to the second timing, if the timing can be changed to the second timing based on the change in the oxygen concentration within the cylinder.

According to this configuration, when shifting from the premix combustion mode to the diffusion combustion mode with an increase in the load of the engine body, the fuel injection pattern is switched from the premix combustion pattern to the diffusion combustion pattern and, after that, the timing of the diffusion combustion pattern is set to the third timing that is later than the second timing which is set beforehand as the injection timing of the diffusion combustion mode. That is, the fuel injection timing is changed discontinuously from the first timing to the third timing.

The second timing that is the injection timing in the diffusion combustion mode is located at or near a top dead center of a compression stroke, and, on the other hand, since the third timing is a timing later than the second timing, the fuel injection is substantially within an expansion stroke. Since setting the timing of the diffusion combustion pattern to the third timing causes the fuel to be injected during a descent of a piston, it is advantageous in a fuel mixing ability and it is effective in reduction of NOx and soot. In addition, combustion will be slow and, thus, it is advantageous in NVH. Therefore, setting the fuel injection timing to the third timing and performing the fuel injection in the diffusion combustion pattern avoids the problem of NVH and exhaust emission.

On the other hand, the EGR amount control module shifts from a state in the cylinder corresponding to the premix combustion mode by the control of the EGR gas amount introduced into the cylinder to a state in the cylinder corresponding to the diffusion combustion mode. Associated with this, since the oxygen concentration within the cylinder becomes higher, the third timing is changed toward the second timing according to the change in the oxygen concentration. As described above, the injection timing may be gradually changed toward the second timing, or may be jumped to the second timing. In this way, the shift from the premix combustion mode to the diffusion combustion mode is completed by changing the fuel injection timing to the second timing, while avoiding the problem of NVH and exhaust emission.

This control is effective in a case where the fuel injection amount needs to be increased associated with the increase in the load of the engine body, and the oxygen concentration within the cylinder also needs to be changed comparatively greatly, when such an oxygen concentration cannot be changed rapidly but it changes only continuously, and corresponding to the continuous change in the oxygen concentration, when a mode of the fuel injection (that is, particularly the fuel injection timing, although the mode of injection includes the pattern, timing, and injection amount of the fuel injection) is continuously changed, the NVH or exhaust emission inevitably exceeds the tolerance limit. That is, after the fuel injection timing is jumped to the third timing on the retard side and, in this state where it is set to the third timing on the retard side, waiting for the change in the oxygen concentration to follow makes it possible to avoid the tolerance limits of NVH and exhaust emission when shifting from the premix combustion mode to the diffusion combustion mode.

The injection control module may execute the transition control when shifting to the diffusion combustion mode from a state where the load of the engine body is high, that is a state where the oxygen concentration within the cylinder is below a predetermined value in the premix combustion mode. The injection control module may inhibit the transition control when shifting to the diffusion combustion mode from a state where the load of the engine body is low, that is a state where the oxygen concentration within the cylinder is higher than the predetermined value in the premix combustion mode.

The third timing is a timing later than a normal fuel injection timing (i.e., the second timing) in the diffusion combustion mode, where a combustion efficiency is relatively low and it is disadvantageous in fuel consumption.

Moreover, upon the shift from the premix combustion mode to the diffusion combustion mode, when changing the fuel injection timing continuously corresponding to the change in the oxygen concentration within the cylinder, fundamentally, the situation where the tolerance limits of NVH and exhaust emission are unavoidable is when a difference of the oxygen concentrations within the cylinder becomes large before and after the shift of the combustion mode. Specifically, this is a case of the shift from a state where the oxygen concentration within the cylinder is low when the load is comparatively high in the premix combustion mode to the diffusion combustion mode where the oxygen concentration within the cylinder is relatively high. Unlike this, even if it is a case of the shift from the premix combustion mode to the diffusion combustion mode, if the shift is made to the diffusion combustion mode from a state where the oxygen concentration within the cylinder is high when the load is comparatively low, the difference of the oxygen concentrations within the cylinder before and after the shift is comparatively small. In this case, the fuel injection timing can be changed continuously according to the change in the oxygen concentration within the cylinder, while avoiding the tolerance limits of NVH and exhaust emission.

Therefore, the above transition control is executed only when the tolerance limits of NVH and exhaust emission cannot be avoided, and, on the other hand, the above transition control is inhibited when the tolerance limits of NVH and exhaust emission can be avoided. Thereby, the fuel consumption is improved upon the shift from the premix combustion mode to the diffusion combustion mode, while certainly avoiding the tolerance limits of NVH and exhaust emission.

The injection control module may execute, before switching from the premix combustion pattern to the diffusion combustion pattern, a set of fuel injections at least containing a fuel injection at or near the first timing and a fuel injection at or near the second timing.

The inventors have found out that the quality of combustion sound is different between the premix combustion and the diffusion combustion, originated in a difference of the combustion phenomenon. For this reason, upon the shift from the premix combustion mode to the diffusion combustion mode, the sudden change in the sound quality may give a person on board a sense of incongruity, even if the sound pressure change in the combustion sound is suppressed.

Therefore, before switching to the diffusion combustion pattern from the state where the premix combustion is performed with the fuel injection of the premix combustion pattern, the fuel injection set at least containing the fuel injection at or near the first timing and the fuel injection at or near the second timing is executed. The fuel injection set includes both the fuel injection at or near the first timing corresponding to the premix combustion mode and the fuel injection at or near the second timing corresponding to the diffusion combustion mode. In other words, the above fuel injection set includes both an injection characteristic of the premix combustion pattern and an injection characteristic of the diffusion combustion pattern because the injection timings are close to each other. For this reason, the quality of combustion sound turns into an intermediate sound quality between the premix combustion and the diffusion combustion. As a result, upon the shift from the premix combustion mode to the diffusion combustion mode, the sudden change in the quality of combustion sound is avoided, and the sense of incongruity to be given to the person on board can be eliminated or reduced.

According to another aspect of the present invention, an automobile-mount diesel engine disclosed herein includes the engine body, the injection control module, and the EGR amount control module. The injection control module executes, when shifting from the diffusion combustion mode to the premix combustion mode with a decrease in the load of the engine body, a fuel injection of the diffusion combustion pattern at a third timing that is later than the second timing. After an oxygen concentration within the cylinder turns into a predetermined concentration, the injection control module executes a transition control in which the fuel injection pattern is switched from the diffusion combustion pattern to the premix combustion pattern and the fuel injection of the premix combustion pattern is executed at the first timing.

Contrary to this, when shifting from the diffusion combustion mode to the premix combustion mode associated with the decrease in the load of the engine body, the fuel injection pattern remains the same in the diffusion combustion pattern, the timing of that fuel injection is set to the third timing that is later than the second timing that is set beforehand as the injection timing in the diffusion combustion mode. Thereby, since the problem of NVH and exhaust emission can be avoided, it waits in this state for the change in the oxygen concentration to follow. Here, the third timing may be changed to a retard side according to the change in the oxygen concentration within the cylinder. Thereby, it becomes possible to set the third timing to the advance side as much as possible, and it is advantageous to the improvement of the fuel consumption.

Then, after the oxygen concentration within the cylinder turns into the predetermined concentration (in other words, in this state, after being switched from the diffusion combustion pattern to the premix combustion pattern and the fuel injection mode is changed to the first timing, and the tolerance limit of NVH becomes avoidable), the fuel injection mode is switched. That is, the fuel injection timing is changed discontinuously or jumped from the third timing on the retard side to the first timing. In this way, the shift from the diffusion combustion mode to the premix combustion mode is completed, while avoiding the problem of NVH and exhaust emission.

The injection control module may execute the transition control when shifting from the diffusion combustion mode to a state where the load of the engine body is high, that is a state where the oxygen concentration within the cylinder is below a predetermined value in the premix combustion mode. The injection control module may inhibit the transition control when shifting from the diffusion combustion mode to a state where the load of the engine body is low, that is a state where the oxygen concentration within the cylinder is higher than the predetermined value in the premix combustion mode.

Similarly to the above, upon the shift from the diffusion combustion mode to the premix combustion mode, when continuously changing the fuel injection timing to correspond to the change in the oxygen concentration within the cylinder, the situation where the tolerance limits of NVH and exhaust emission are unavoidable is fundamentally when the difference of the oxygen concentrations within the cylinder becomes large before and after the shift of the combustion mode. For this reason, the above transition control is executed only when shifting from the diffusion combustion mode where the oxygen concentration within the cylinder is comparatively high to the state where the oxygen concentration within the cylinder is low where the load is relatively high even in the premix combustion mode. On the other hand, the above transition control is inhibited when shifting from the diffusion combustion mode to a state where the oxygen concentration within the cylinder is high where when the load is comparatively low even in the premix combustion mode. Thereby, the fuel consumption can be improved.

The injection control module may execute a fuel injection set at least containing a fuel injection at or near the first timing and a fuel injection at or near the second timing before switching from the diffusion combustion pattern to the premix combustion pattern.

Similarly to the above, also upon the shift from the diffusion combustion mode to the premix combustion mode, the quality of combustion sound changes suddenly. Therefore, executing the fuel injection set at least containing the fuel injection at or near the first timing and the fuel injection near the second timing before switching the fuel injection pattern from the diffusion combustion pattern to the premix combustion pattern avoids the sudden change in the sound quality and avoids or reduces the sense of incongruity to be given to the person on board.

The third timing may be set between a tolerance limit of soot and a misfire limit so that atomized fuel injected during the expansion stroke reaches in a cavity recessed in the top of a piston within the cylinder.

If the fuel injection timing is retarded too much, it causes the injected fuel not to be ignited, resulting in a misfire. Therefore, the third timing is preferable to be set earlier than the misfire limit, and in order to not exceed the tolerance limit of soot, the third timing is preferable to be set later than the tolerance limit of soot.

The diffusion combustion pattern may include a main injection and two or more pre-stage injections executed before the main injection.

Since pre-combustion is caused by two or more pre-stage injections, the inside of the cylinder becomes in a state where an ignition easily occurs upon the main injection. As a result, an ignition delay of the fuel injected becomes shorter by the execution of the main injection. This makes the main combustion slow, and avoids or suppresses a sudden rise in a heat release rate. That is, it is advantageous when reducing the combustion noise. In addition, the two or more pre-stage injections lessen the fuel injection amount of the main injection, and are also advantageous for suppressing soot.

An injection time interval between the pre-stage injections and the main injection may be shorter than an injection time interval of the pre-stage injections.

This configuration is equivalent to the execution of at least two pre-stage injections, which contain the pre-stage injection (pre-injection) executed at a timing comparatively close to the main injection and the pre-stage injection (pilot injection) executed at a timing comparatively separated from the main injection. The pilot injection among the two pre-stage injections increases a pre-mixing ability, and improves an air utilization rate. Whereas, the pre-injection causes the pre-combustion before the main combustion and, as described above, it shortens the ignition delay of the fuel injected by the main injection.

The diffusion combustion pattern may include a main injection and a post-stage injection that is executed after a predetermined time interval after the main injection. The fuel injection for the diffusion combustion that is set to the third timing may be set so that, with respect to the fuel injection for the diffusion combustion that is set to the second timing, the post-stage injection remains at the same timing and only the timing of the main injection is delayed.

The post-stage injection is executed after the predetermined time interval after the main injection. In other words, the post-stage injection is executed at a timing which is comparatively separated from the main injection. For this reason, the post-stage injection suppresses a temperature drop within the cylinder during the expansion stroke after a lapse of the peak of the heat release rate of the main combustion and, thereby holding the temperature within the cylinder at a high temperature. This facilitates oxidization of the soot generated during a first stage and a middle stage of combustion, while utilizing air outside the cavity, and reduces a discharge of the soot.

Moreover, upon the mutual switching between the premix combustion mode and the diffusion combustion mode, when the fuel injection of the diffusion combustion pattern is carried out at the third timing, only the timing of the main injection is delayed but the timing of the post-stage injection is not delayed. Therefore, the avoidance of the tolerance limits of NVH and exhaust emission can be achieved by retarding the main injection, while securing the oxidization effect of the soot as described above.

The EGR amount control module may adjust the internal EGR gas amount by controlling at least one of operations of an intake valve and an exhaust valve of the engine body.

Accordingly, since a large amount of EGR gas can be introduced into the cylinder, it is advantageous especially in the premix combustion mode where the load is low. In addition, since its control response becomes comparatively high, it is advantageous in that a change in the oxygen concentration within the cylinder becomes comparatively fast when switching the combustion mode between the premix combustion mode and the diffusion combustion mode.

According to another aspect of the present invention, a method of controlling an automobile-mount diesel engine is disclosed herein. The engine is mounted in an automobile and supplied with fuel mainly containing diesel fuel.

The control method includes executing a fuel injection of a premix combustion pattern containing one or more injections at a first timing, while introducing an amount of EGR gas according to an operating condition of the engine into a cylinder, when a load of the engine is low, to operate the engine in a premix combustion mode. The method also includes executing a fuel injection of a diffusion combustion pattern containing one or more injections at a second timing that is later than the first timing, when the load of the engine is high, to operate the engine in a diffusion combustion mode. The method also includes switching the fuel injection pattern from the premix combustion mode to the diffusion combustion mode, while introducing the amount of EGR gas according to the operating condition of the engine into the cylinder, when shifting from the premix combustion pattern to the diffusion combustion pattern with an increase in the load of the engine. The method also includes, immediately after switching to the diffusion combustion pattern, setting the fuel injection timing to a third timing that is later than the second timing and, after that, changing the third timing toward the second timing according to the change in the oxygen concentration within the cylinder.

Moreover, according to another aspect of the present invention, the control method includes, when shifting from the diffusion combustion mode to the premix combustion mode with a decrease in the engine load, executing a fuel injection of the diffusion combustion pattern at a third timing that is later than the second timing, while introducing the amount of EGR gas according to the operating condition of the engine into the cylinder and, after the oxygen concentration within the cylinder turns into a predetermined concentration, switching the fuel injection pattern from the diffusion combustion pattern to the premix combustion pattern, and executing the fuel injection at the first timing.

As described above, according to the automobile-mount diesel engine and the method of controlling of the engine, when shifting from the premix combustion mode to the diffusion combustion mode, or when shifting from the diffusion combustion mode to the premix combustion mode, the fuel injection timing is changed discontinuously, thereby shifting the combustion mode, while avoiding the tolerance limits of NVH and exhaust emission.

BRIEF DESCRIPTION OF THE DRAWINGS

FIG. 4A is a graph showing a map of a relation between the oxygen concentration and a fuel injection timing, which shows an example of a shift in a case where a continuous shift course from a premix combustion mode to a diffusion combustion mode does not exist, and FIG. 4B shows an example of the shift in a case where the continuous shift course from the premix combustion mode to the diffusion combustion mode exists.

FIG. 5A is a graph showing a map of a relation between the oxygen concentration and the fuel injection timing, which shows an example of the shift in a case where the continuous shift course from the diffusion combustion mode to the premix combustion mode does not exist, and FIG. 5B shows an example of the shift in a case where the continuous shift course from the diffusion combustion mode to the premix combustion mode exists.

DESCRIPTION OF EMBODIMENT

Hereinafter, several embodiments of a diesel engine according to the present invention will be described referring to accompanying drawings. Note the following description of preferable embodiments is essentially only illustration of the present invention.

Embodiment 1

Figure 1:
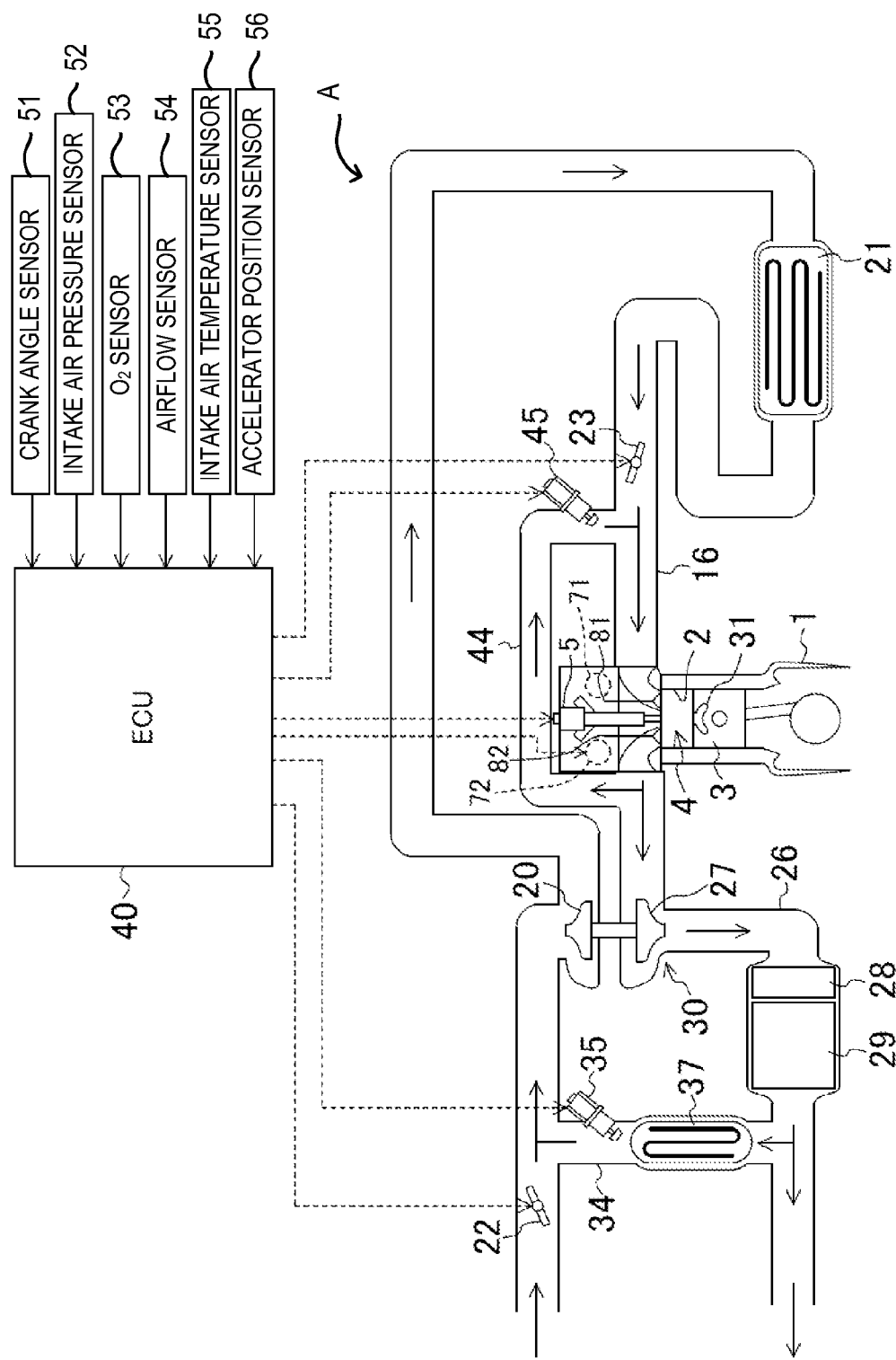
FIG. 1 is a schematic block diagram showing a configuration of a diesel engine.

FIG. 1 shows an example of an engine A, and the reference numeral 1 denotes an engine body mounted in a vehicle. The engine body 1 is a diesel engine to which a fuel which mainly contains diesel fuel is supplied, and has two or more cylinders 2 (only one cylinder is illustrated). A piston 3 is reciprocatably fitted into each cylinder 2, and a cavity 31 which defines a reentrant-type combustion chamber 4 is formed in the top face of the piston 3. Moreover, an injector 5 (fuel injection valve) is disposed in a ceiling part of the combustion chamber 4. The injector 5 injects a high-pressure fuel from a nozzle at a tip part thereof directly into the combustion chamber 4. The engine body 1 has a geometric compression ratio of 15:1 or less (but 12:1 or higher), which is a comparatively low compression ratio engine. The engine body 1 introduces a large amount of EGR gas into the cylinder 2 through a control of EGR valves 35 and 45 in EGR passages 34 and 44 or an opening-and-closing control of exhaust valves 82, as will be described later, to enable a premixed charge compression ignition (PCI) combustion.

The configuration which supplies fuel to the injector 5 for every cylinder 2 is, although its illustration is omitted, so-called a "common rail type" provided with a common fuel distribution pipe (common rail) with which the injectors 5 are connected, respectively, and, thereby enabling two or more times of fuel injections into the respective cylinders 2 during one cycle of the engine. Although the injector 5 may be, as an example, but not limited to, a type having a built-in control valve, where the fuel is injected by changing a lift of the control valve according to an amount of energization to the injector 5.

In an upper part of the engine body 1, valve operating mechanisms 71 and 72 for opening and closing intake valves 81 and the exhaust valves 82, respectively are disposed. In the valve operating mechanism 72 on the side of the exhaust valves 82 among the valve operating mechanisms 71 and 72 on the sides of the intake valves 81 and the exhaust valves 82, a hydraulically-operating variable mechanism for switching an operating mode of the exhaust valve 82 between a normal mode and a special mode is provided (hereinafter, referred to as a "VVM" (Variable Valve Motion) and denoted by the reference numeral 72). The VVM 72 includes, although illustration of the detailed configuration is omitted, a lost-motion mechanism which has two kinds of cams having different cam profiles (a first cam having one cam mountain and a second cam having two cam mountains) and for selectively transmitting an operating state of one of the first and second cams to the exhaust valves. When transmitting the operating state of the first cam to the exhaust valves 82, the VVM 72 operates in the normal mode where the exhaust valves 82 are opened only once in an exhaust stroke and, on the other hand, when transmitting the operating state of the second cam to the exhaust valves 82, the VVM 72 operates in the special mode where the exhaust valves 82 are opened in an exhaust stroke as well as in an intake stroke (that is, the exhaust valves are opened twice). The switching between the normal mode and the special mode of the VVM 72 is performed hydraulically by oil supplied from a hydraulic pump (not illustrated) driven by the engine, and the special mode is used for a control according to internal EGR, as will be described later. Note that the configuration is not limited and any configuration in which the internal EGR gas can be introduced through the control of the intake and exhaust valves 81 and 82 is within the scope of this disclosure. For example, a valve operating system of an electromagnetic drive type in which the intake and exhaust valves 81 and 82 are driven by electromagnetic actuators may be adopted.

To one side face of the engine body 1 (i.e., the right-hand side in FIG. 1), an intake passage 16 for supplying air filtered by an air cleaner (not illustrated) (in other words, fresh air) to the combustion chamber 4 of each cylinder 2 is connected. This intake passage 16 is provided with, from an upstream side to a downstream side, an intake choke valve 22 having a butterfly valve, a compressor 20 which is driven by a turbine 27 of turbocharger 30 (described later) and compresses the intake air, an intercooler 21 which cools the intake air compressed by the compressor 20, and an intercooler (UC) path choke valve 23 having a butterfly valve.

On the other hand, to the other, opposite side face of the engine body 1 (i.e., the left-hand side in FIG. 1), an exhaust passage 26 for discharging combustion gas (i.e., exhaust gas) from the combustion chamber 4 of each cylinder 2 is connected. An upstream end part of the exhaust passage 26 branches into each cylinder 2 to form an exhaust manifold which communicates with the combustion chambers 4 through exhaust ports, respectively. In a part of the exhaust passage 26 downstream from the exhaust manifold, the turbine 27 which is rotated by an exhaust gas flow, and a diesel oxidation catalyst 28 and a DPF (Diesel Particulate Filter) 29 which can purify hazardous components contained in the exhaust gas, are disposed in this order from the upstream side to the downstream side. The oxidation catalyst 28 and the DPF 29 are accommodated in a single casing. The oxidation catalyst 28 has an oxidation catalyst which supports platinum or palladium added to platinum, and facilitates a reaction in which CO and HC in exhaust gas oxidize to generate $CO_2$ and $H_2O$. The DPF 29 captures particulates, such as soot contained in exhaust gas of the engine body 1. Note that the DPF 29 may be coated with an oxidation catalyst material.

The exhaust passage 26 is connected with an upstream end of a first exhaust gas recirculation passage (hereinafter, referred to as a "first EGR passage") 34 for recirculating a part of exhaust gas to an intake side so that the first EGR passage 34 opens in a part of the exhaust passage 26 on the downstream side of the exhaust gas from the DPF 29. A downstream end of the first EGR passage 34 is connected with the intake passage 16 between the intake choke valve 22 and the compressor 20, and recirculates the part of exhaust gas extracted from the exhaust passage 26 to the intake passage 16. Moreover, in an intermediate portion of the first EGR passage 34, an EGR cooler 37 for cooling exhaust gas flowing therein and an exhaust gas recirculating amount adjusting valve 35 (hereinafter, referred to as a "first EGR valve") of which opening can be adjusted, are arranged.

Moreover, an upstream end of a second exhaust gas recirculation passage (hereinafter, referred to as a "second EGR passage") 44 is connected with the exhaust manifold. A downstream end of the second EGR passage 44 is connected with the intake passage 16 at a downstream side of the intercooler 21 (more specifically, at the I/C path choke valve 23). Moreover, in an intermediate portion of the second EGR passage 44, a second exhaust gas recirculation amount adjusting valve 45 (hereinafter, referred to as a "second EGR valve") of which an opening can be adjusted is arranged. Note that an EGR cooler may be interposed in an intermediate portion of the second EGR passage 44.

The respective injectors 5, the VVM 72 of the valve operating system, the intake choke valve 22, the I/C path choke valve 23, and the first and second EGR valves 35 and 45 and the like are all operated in response to control signals from an electronic control unit (ECU) 40. The ECU 40 includes a microprocessor having a CPU, a memory, a group of counter timers, interfaces, and a path which mutually connects these components. To the ECU 40, output signals at least from a crank angle sensor 51 for detecting a rotation angle of a crankshaft of the engine body 1, an intake pressure sensor 52 for detecting a pressure state of the intake air, an $O_2$ sensor 53 for detecting an oxygen concentration in exhaust gas, an airflow sensor 54 for detecting a flow rate of air inhaled from the exterior into the engine body 1, an intake air temperature sensor 55 for detecting a temperature of intake air after mixing with the EGR gas, and an accelerator position sensor 56 for detecting a depression amount (i.e., an accelerator opening) of an accelerator pedal (not illustrated), are inputted, respectively. The ECU 40 performs various calculations based on these signals to determine a state of the engine body 1 or the vehicle and, based on the state, it outputs the control signals to the injectors 5, the VVM 72 of the valve operating system, and the actuators of various kinds of valves 22, 23, 35 and 45, as described above. The ECU 40 constitutes an injection control module and an EGR amount control module.

(Outline of Engine Combustion Control)

A fundamental control of the engine body 1 by the ECU 40 is mainly to determine a target torque (in other words, a target load) based on the accelerator opening, and obtain injection amounts, injection timings and the like of fuel corresponding to the target torque or load by a control of operating the injectors 5. Moreover, the ECU 40 controls a recirculating ratio of exhaust gas into the cylinders 2 by a control of openings of the choke valves 22 and 23 and the first and second EGR valves 35 and 45 (i.e., an external EGR control), and a control of the VVM 72 (i.e., an internal EGR control).

Figure 2:
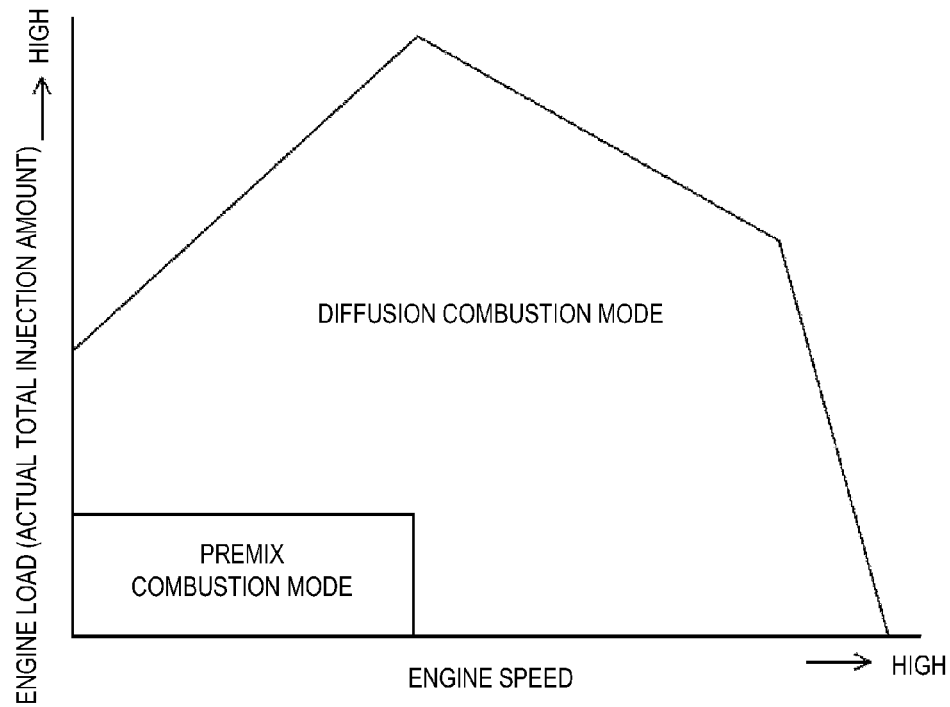
FIG. 2 shows an example of a map of combustion modes according to a state of the diesel engine.

FIG. 2 is a map showing combustion modes according to the engine state. As shown in FIG. 2, the engine body 1 switches between two combustion modes, which are a diffusion combustion mode and a premix combustion mode, according to an engine speed and an engine load (in other words, an actual total injection amount of fuel).

Figure 6A:
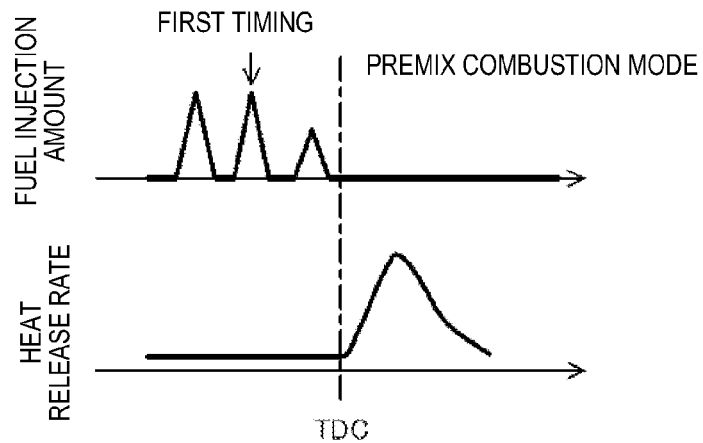
FIG. 6A shows an example of a fuel injection mode in the premix combustion mode and an example of a history of a heat release rate associated therewith.
Figure 6B:
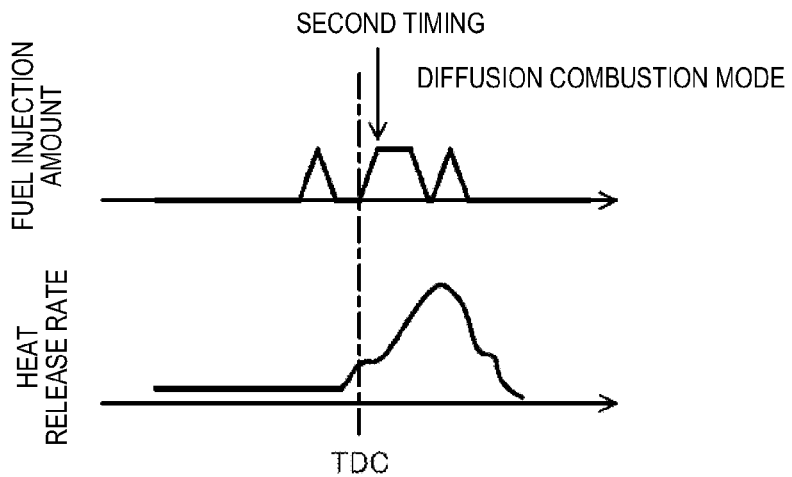
FIG. 6B shows an example of the fuel injection mode in the diffusion combustion mode and an example of the history of the heat release rate associated therewith.

Among these modes, in the diffusion combustion mode, as illustrated in the upper part of FIG. 6B, fuel is injected into the cylinder 2 when the piston 3 is at or near a top dead center of the compression stroke (i.e., main injection). Thereby, a fuel injection by the injector 5 and an ignition of the fuel are performed in parallel. In this embodiment, in the diffusion combustion mode, a pre-stage injection is performed prior to the main injection, while a post-stage injection is performed after the main injection. The fuel injection of this mode may be herein referred to as a "diffusion combustion fuel injection" or a "diffusion combustion pattern." Note that the number of times of the fuel injection in the diffusion combustion mode is not limited to three times, and may be set suitably. Note that the lower part of FIG. 6B shows an example of a history of a heat release rate within the cylinder 2 associated with the above fuel injections.

On the other hand, in the premix combustion mode, fuel is injected into the cylinder 2 at an early timing during the compression stroke, and the fuel injection is finished before the fuel is ignited. For example, as shown in the upper part of FIG. 6A, in this embodiment, as a fuel injection mode in the premix combustion mode (i.e., a premix combustion pattern), fuel injections are performed three times with a predetermined time interval therebetween during the compression stroke before reaching a top dead center of the compression stroke. Note that the lower part of FIG. 6A shows an example of the history of the heat release rate within the cylinder 2 associated with the above fuel injections. Here, in the premix combustion fuel injection mode, a fuel injection amount which is injected at a relatively early timing is set to a relatively large quantity, and a fuel injection amount which is injected at a relatively late timing is set to relatively small quantity. This is because a pre-mixing ability of the fuel is increased by injecting more fuel at the earlier stage. Note that the number of times of the fuel injection in the premix combustion mode is not limited to three times, and may be set suitably. The fuel thus injected combusts by self-ignition at or near a top dead center of the compression stroke in the state where the fuel is fully mixed with air (i.e., PCI combustion). In this premix combustion mode, atmosphere with uniform fuel can be created before ignition of the fuel, and an equivalence ratio of the fuel and air is made comparatively low to suppress incomplete combustion of the fuel and generation of soot. The premix combustion mode is advantageous in fuel consumption and emission, but since it is necessary to secure a time for making the fuel uniform, it is used when the engine load is comparatively low and the engine speed is comparatively low. Therefore, as shown in FIG. 2, the engine will be in the diffusion combustion mode in other ranges where the engine speed is high and/or the engine load is high.

Figure 6C:
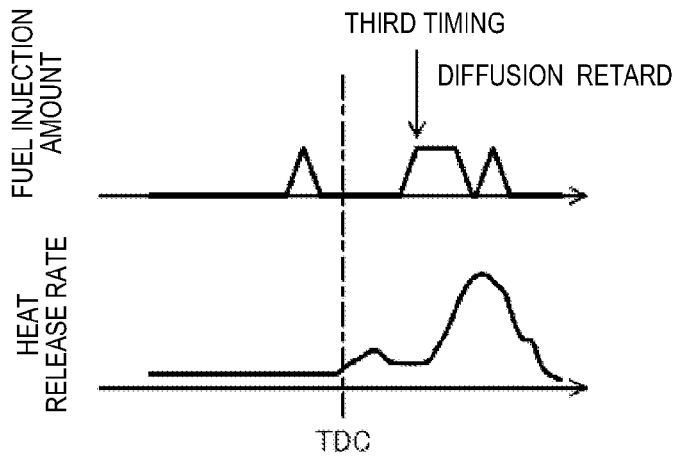
FIG. 6C shows an example of the fuel injection mode in the diffusion retard mode and an example of the history of the heat release rate associated therewith.

As clear from comparison of FIGS. 6A and 6B, the fuel injection mode is different between the premix combustion mode and the diffusion combustion mode. When the timing of the second fuel injection is set to the timing of the main injection (i.e., the first timing), as the timing which represents the three times of the fuel injection timing in the premix combustion mode, the timing of the main injection in the diffusion combustion mode (i.e., the second timing) is set later than the first timing. Note that the fuel injection amounts and the heat release rates which are shown in FIGS. 6A and 6B, and FIG. 6C which is described later, do not necessarily show relative fuel injection amounts and relative heat release rates for comparison between these graphs.

Figure 3:
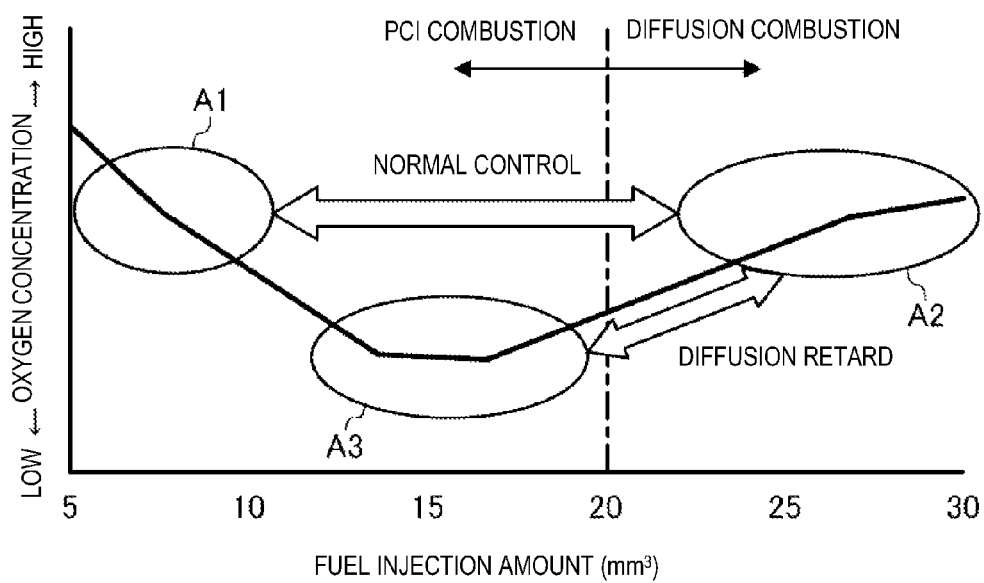
FIG. 3 is a graph illustrating a relation between a fuel injection amount and an oxygen concentration inside a cylinder.

Here, the oxygen concentration within the cylinder when executing the diffusion combustion mode is set higher than the oxygen concentration when performing the premix combustion mode. FIG. 3 shows an example of a relation between the oxygen concentration within the cylinder and the fuel injection amount at a predetermined engine speed. A range with a relatively greater fuel injection amount (a range on the right-hand side in FIG. 3) corresponds to the diffusion combustion mode, and a range with a relatively less fuel injection amount (a range on the left-hand side in FIG. 3) corresponds to the premix combustion mode.

When executing the diffusion combustion mode, since it becomes easy to generate CO, HC or soot if the equivalence ratio becomes high (i.e., oxygen becomes less), it is necessary to make the oxygen concentration within the cylinder higher than the case where the premix combustion mode is executed to suppress the incomplete combustion. In other words, the EGR amount is increased when executing the premix combustion mode rather than when executing the diffusion combustion mode. In the engine A described above, a comparatively large amount of the internal EGR gas is introduced into the cylinder 2 through the control of the VVM 72 at least in the premix combustion mode and at the time of the shift between the combustion modes (described later). The control of the internal EGR gas amount through the control of the VVM 72 is advantageous in that, when shifting between the combustion modes, a response of the change in the oxygen concentration within the cylinder 2 is increased and the shift of the combustion mode thus completes earlier.

Also in the premix combustion mode, the oxygen concentration is again made higher from a point of view of combustion stability when the load is relatively low where the fuel injection amount decreases further. Therefore, as shown in FIG. 3, when the fuel injection amount is a lot (i.e., the diffusion combustion mode, near the right end in this graph) and when the fuel injection amount is less (i.e., when the load in the premix combustion mode is low, near the left end in this graph), the oxygen concentration becomes relatively high. Further, when the fuel injection amount is moderate (i.e., when the load in the premix combustion mode is high, near the center in this graph), the oxygen concentration becomes relatively low and, as the whole graph, the engine has a characteristic in which the central part is downwardly convex.

Thus, for example, associated with the change is the engine load, when switching between the premix combustion mode and the diffusion combustion mode along with the change in the fuel injection amount, there are two kinds of shift modes as shown in FIG. 3. One case is a shift from a range A1 where the oxygen concentration is comparatively high in the premix combustion mode to a range A2 in the diffusion combustion mode, or a shift from the range A2 in the diffusion combustion mode to the range A1 in the premix combustion mode. The other case is a shift from a range A3 where the oxygen concentration is comparatively low in the premix combustion mode to the range A2 in the diffusion combustion mode, or a shift from the range A2 in the diffusion combustion mode to the range A3 in the premix combustion mode.

Among these, the former shift mode (i.e., between the range A1 and the range A2), the change in the oxygen concentration within the cylinder is comparatively small before and after the shift. Therefore, fundamentally, by continuously changing the fuel injection amount, the injection pattern, and the injection timing while performing the change control of the internal EGR gas amount through the VVM 72 and the like, a smooth combustion mode shift is possible while avoiding all the generating limits of NOx, NVH, and soot.

On the other hand, in the latter shift mode (i.e., between the range A2 and the range A3), the change in the oxygen concentration within the cylinder is comparatively large before and after the shift. Therefore, at least one of the generating limits of NVH and soot may not be able to be avoided when the fuel injection amount, the injection pattern, and the injection timing are changed continuously, while performing the change control of the internal EGR gas amount through the VVM 72 and the like.

This is described referring to FIGS. 4A and 4B, and FIGS. 5A and 5B. FIGS. 4A and 4B, and FIGS. 5A and 5B are maps showing relations between the oxygen concentration and the injection timing, respectively. In these maps, the oxygen concentration within the cylinder becomes lower (in other words, the EGR amount is increased) as it goes toward the right-hand side in the horizontal axis, and, on the other hand, the oxygen concentration within the cylinder becomes higher (in other words, the EGR amount is reduced) as it goes toward the left-hand side in the horizontal axis. Further, the injection timing is advanced as it goes upward in the vertical axis, and, on the other hand, the injection timing is retarded as it goes downward in the vertical axis. In addition, the tolerance limits of NVH, soot, and NOx, and the misfire limit are shown in these maps, respectively. In the graphs, 10Q, 15Q, and 25Q indicate the fuel injection amounts, and the tolerance limits and misfire limit of NVH, soot, and NOx vary according to the fuel injection amount. Particularly, a relation between the fuel injection amounts is 10Q<15Q<25Q, and each tolerance limit will expand with the increase in the fuel injection amount.

First, FIG. 4A shows an example in a case where the fuel injection amount is changed from 15Q to 25Q with an increase in the load of the engine, while the combustion mode shifts from the premix combustion mode to the diffusion combustion mode. A state before the shift is shown by a white circle P11 in this graph, and this state corresponds to a state where the load is comparatively high in the premix combustion mode (i.e., the range A3 in FIG. 3), where the oxygen concentration is low. Moreover, a state after the shift is shown by a black circle P12 in this graph, and this state corresponds to the range A2 in FIG. 3, where the oxygen concentration is high. Here, when shifting from the white circle P11 to the black circle P12, even if the injection timing is retarded gradually and the oxygen concentration is made gradually higher (i.e., setting the shift course straightly extended obliquely downward from the white circle P11 toward the black circle P12 in this graph), the tolerance limit of NVH of 25Q and the tolerance limit of soot of 25Q are overlapped mutually between the white circle P11 and the black circle P12. Therefore, the shift course interferes with the tolerance limit of NVH and/or the tolerance limit of soot. When an obliquely downward shift course is set and the injection timing and the oxygen concentration are continuously changed along with the shift course, NVH and soot will inevitably exceed the tolerance limits. Note that, even if an obliquely downward shift course is set from the white circle P11 toward the black circle P12 without increasing the fuel injection amount (which remains at 15Q), the tolerance limit of NVH of 15Q and the tolerance limit of soot of 15Q are adjacent to each other between the white circle P11 and the black circle P12, the shift course will interfere with either one of the tolerance limits of NVH and soot. Therefore, when shifting the combustion mode from the premix combustion mode to the diffusion combustion mode, while changing the fuel injection amount from 15Q to 25Q, the shortest shift course from the white circle P11 to the black circle P12 does not exist.

On the other hand, FIG. 4B shows an example in a case where the combustion mode shifts from the premix combustion mode to the diffusion combustion mode, while the fuel injection amount is changed from 10Q to 25Q with an increase in the load of the engine. A state before the shift is shown in this graph by a white circle P21, and this state corresponds to a state where the load is comparatively low in the premix combustion mode (i.e., the range A1 in FIG. 3), where the oxygen concentration is comparatively high. Moreover, a state after the shift is shown by a black circle P22 in this graph. Here, when shifting from the white circle P21 to the black circle P22, it is possible to avoid the tolerance limit of NVH as well as to avoid the tolerance limit of soot, by changing the fuel injection amount to 25Q and retarding the injection timing (see L21, L22, and L23 in this graph). Therefore, it is possible to shift the combustion mode from the premix combustion mode to the diffusion combustion mode while avoiding all the tolerance limits of NVH, soot, and NOx. In other words, in the case where the combustion mode is shifted from the premix combustion mode to the diffusion combustion mode while changing the fuel injection amount from 10Q to 25Q, the shortest shift course where the fuel injection mode and the oxygen concentration within the cylinder are both continuously changed from the white circle P21 toward the black circle P22 exists.

FIG. 5A shows an example in a case where the combustion mode shifts from the diffusion combustion mode to the premix combustion mode while the fuel injection amount is changed from 25Q to 15Q with a decrease in the engine load. A state before the shift is shown in this graph by a white circle P31, and it corresponds to the range A2 in FIG. 3. On the other hand, a state after the shift is shown in this graph by a black circle P32 and, as described above, it corresponds to a state where the load is comparatively high in the premix combustion mode (i.e., the range A3 in FIG. 3), where the oxygen concentration is low. Similarly to the case of FIG. 4A, when shifting from the white circle P31 to the black circle P32, even if the injection timing is gradually advanced while the oxygen concentration is gradually lowered, that is, even if setting in this graph a shift course straightly extending obliquely upward from the white circle P31 toward the black circle P32, the shift course will interfere with the tolerance limit of NVH and/or the tolerance limit of soot. Therefore, when shifting the combustion mode from the diffusion combustion mode to the premix combustion mode, while changing the fuel injection amount from 25Q to 15Q, the shortest shift course from the white circle P31 to the black circle P32 does not exist.

On the other hand, FIG. 5B shows an example in a case where the combustion mode shifts from the diffusion combustion mode to the premix combustion mode while the fuel injection amount is changed from 25Q to 10Q with a decrease in the engine load. A state before the shift is shown by a white circle P41 in this graph, and it corresponds to the range A2 in FIG. 3. A state after the shift is shown in this graph by a black circle P42, and it corresponds to a state where the load is comparatively low in the premix combustion mode (i.e., the range A1 in FIG. 3), where the oxygen concentration is comparatively high. Here, when shifting from the white circle P41 to the black circle P42, it is possible to avoid the tolerance limit of NVH while avoiding the tolerance limit of soot by changing the fuel injection amount from 25Q to 10Q while advancing the injection timing (see L41 and L42 in this graph). Therefore, it is possible to shift the combustion mode from the premix combustion mode to the diffusion combustion mode while avoiding all the tolerance limits of NVH, soot, and NOx. In other words, in the case where the combustion mode is shifted from the diffusion combustion mode to the premix combustion mode while changing the fuel injection amount from 25Q to 10Q, the shortest shift course where both the fuel injection mode and the oxygen concentration within the cylinder are continuously changed from the white circle P41 toward the black circle P42 exists.

Thus, in the above examples, like the shift of the combustion mode associated with the change in the fuel injection amount from 15Q to 25Q, and the shift of the combustion mode associated with the change in the fuel injection amount from 25Q to 15Q, when shifting between the range where the load is relatively high in the premix combustion mode, and the diffusion combustion mode, the fuel injection timing may be unable to be changed continuously due to the large oxygen concentration difference before and after the shift.

Therefore, in the diesel engine A disclosed herein, as shown by white arrows in FIGS. 4A and 5A, shift courses which bypass the tolerance limits of NVH and soot which exist between the white circle and the black circle, respectively, are set, and the fuel injection mode and the oxygen concentration within the cylinder are changed so as to follow the shift courses to shift the combustion mode.

Specifically, when shifting from the premix combustion mode to the diffusion combustion mode, as shown by P14 in FIG. 4A, the fuel injection timing is retarded more than the fuel injection timing in the diffusion combustion mode (see P12). This is referred to as a "diffusion retard mode."

FIG. 6C shows an example of the fuel injection mode in the diffusion retard mode. This fuel injection mode has a pattern, similar to the diffusion combustion mode, where three fuel injections of the main injection, the pre-stage injection, and the post-stage injection are carried out, while the injection timings of the main injection and the post-stage injection are set at a third timing which is retarded more than the second timing which is the injection timing of the main injection and the post-stage injection in the diffusion combustion mode (see FIGS. 6B and 6C). Note that, the timing of the pre-stage injection is before a top dead center of the compression stroke, and this is substantially the same as the timing of the pre-stage injection in the diffusion combustion mode (see FIG. 6B). By executing the main injection and the post-stage injection during the expansion stroke where the piston 3 descends, it is advantageous in the fuel mixing ability, it is effective in reduction of NOx and soot, the combustion becomes slow, and it is advantageous in NVH. That is, in the diffusion retard mode, as shown by L12 in FIG. 4A, by jumping the fuel injection timing to the retard side, the tolerance limit of soot can be avoided as well as avoiding the tolerance limits of NVH and NOx.

After that, according to the change in the oxygen concentration within the cylinder 2, the fuel injection timing is advanced toward the second timing which is the fuel injection timing in the diffusion combustion mode while avoiding the tolerance limit of soot and, finally, the timing is set to the second timing shown by P12 (see L13 in the same graph). In this way, it is possible to shift from the premix combustion mode of P11 to the diffusion combustion mode of P12, while avoiding the tolerance limits of NVH, NOx, and soot.

Here, the start of execution of the above diffusion retard mode may be set as follows. That is, as shown by L11 in FIG. 4A, at the beginning of switching from the premix combustion mode to the diffusion combustion mode, the normal control may be executed where the fuel injection mode (i.e., the fuel injection amount, the injection timing, and the injection pattern) is changed continuously. Then, when exceeding the tolerance limit of NVH, soot, or NOx (see P13 in the same graph), the injection pattern may be switched to the diffusion combustion pattern in order to execute the diffusion retard mode, to jump the fuel injection timing to the third timing.

Here, since it will misfire if the main injection is retarded greatly, the third timing is set within a range which does not exceed the misfire limit. Therefore, the third timing is set between the tolerance limit of soot and the misfire limit, as shown by P14. Moreover, from a point of view of suppressing an increase in the fuel consumption, it is preferable that the third timing is set earlier as much as possible and, for this reason, the third timing is set near the tolerance limit of soot, and the timing will be changed to the second timing along the tolerance limit of soot.

Contrary to this, when shifting from the diffusion combustion mode to the premix combustion mode, as shown by P33 in FIG. 5A, a diffusion retard mode is executed where the fuel injection timing is retarded more than the fuel injection timing P31 in the diffusion combustion mode (see L31 in the same graph). Thereby, the tolerance limit of soot is avoided as well as the tolerance limits of NVH and NOx. Then, the fuel injection timing is retarded while avoiding the tolerance limit of soot according to the reduction of the oxygen concentration within the cylinder 2. Specifically, by changing the fuel injection amount from 25Q to 15Q, the injection timing may be retarded along the tolerance limit of soot at 15Q (see L32 in this graph). Thereby, the increase in fuel consumption is avoided. Thus, when shifted to the premix combustion mode, the ECU 40 waits the for oxygen concentration for being able to avoid the tolerance limit of NVH and, then, when it becomes in the state where NVH can be avoided (see P34), the timing is advanced to the first timing which is the injection timing set as the premix combustion mode (see L33, P35). After that, it will shift to the state in the predetermined premix combustion mode with the change in the oxygen concentration (see L34, P32). In this way, it is possible to shift from the diffusion combustion mode of P31 to the premix combustion mode of P32, while avoiding the tolerance limits of NVH and soot.

Here, similarly to the above, since it will misfire if the main injection is retarded greatly, the third timing is set within the range which does not exceed the misfire limit. However, from a point of view of reducing the fuel consumption as much as possible, as shown by L32 in FIG. 5A, near the tolerance limit of soot, it is preferable to retard the injection timing along its tolerance limit.

Figure 7:
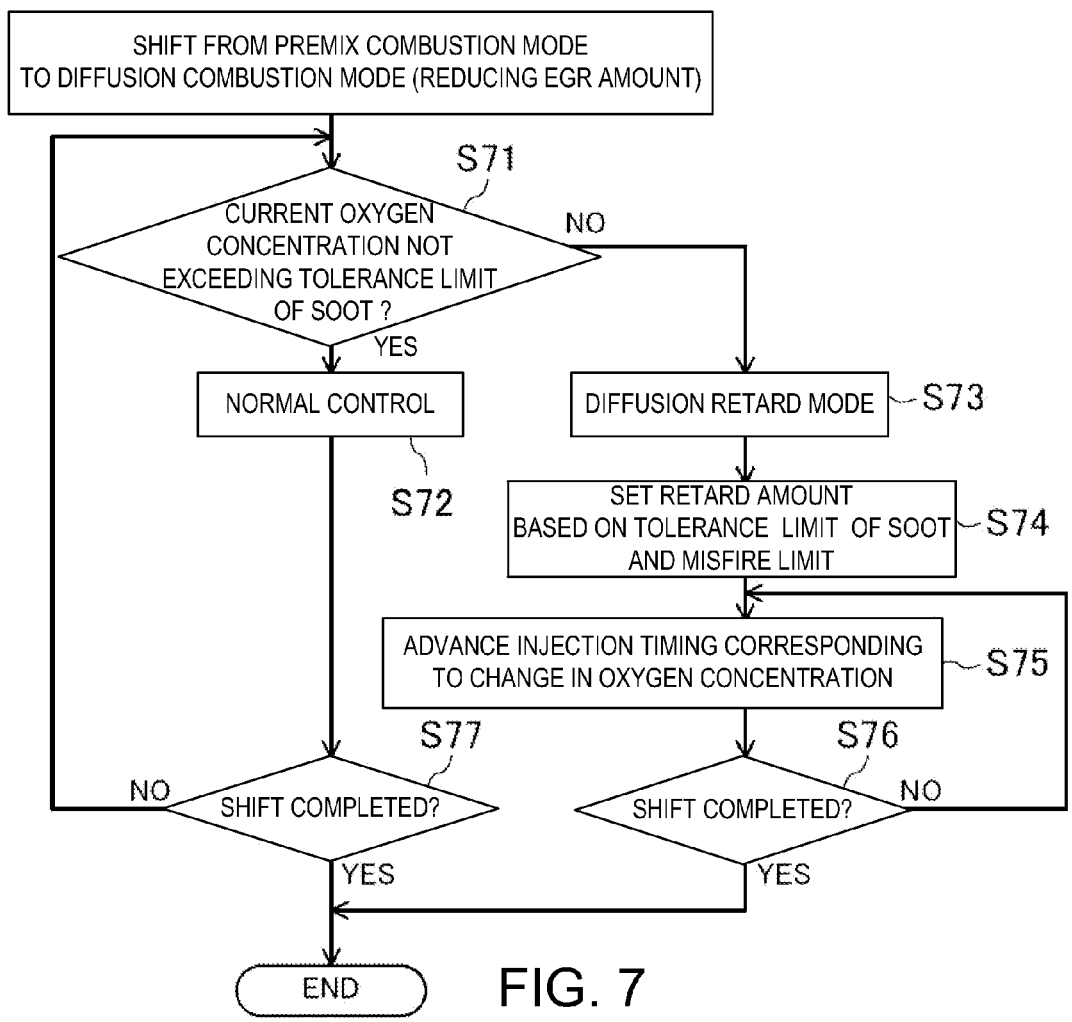
FIG. 7 is a flowchart according to a shift control from the premix combustion mode to the diffusion combustion mode.
Figure 8:
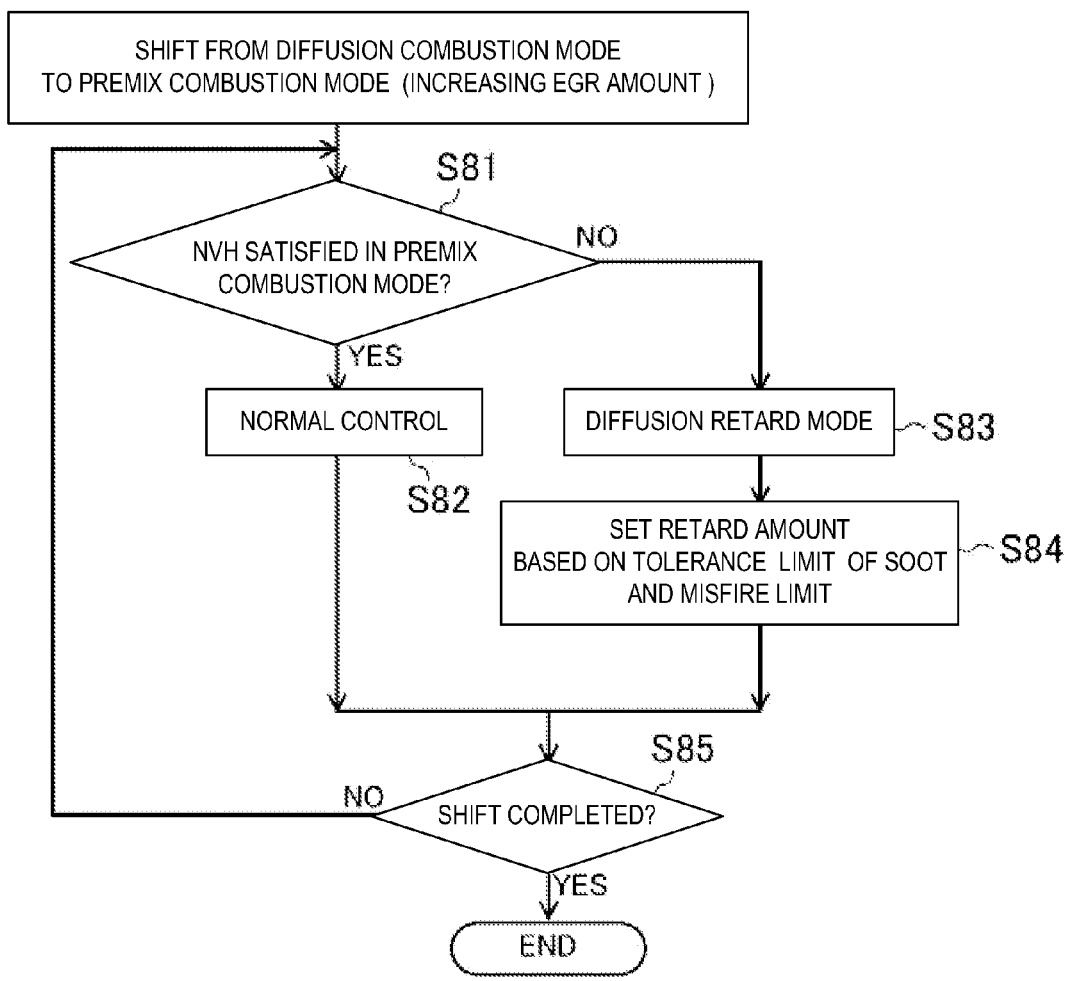
FIG. 8 is a flowchart according to a shift control from the diffusion combustion mode to the premix combustion mode.

Next, the shift control of the combustion mode executed by the ECU 40 is described referring to flowcharts of FIGS. 7 and 8. FIG. 7 shows a shift control from the premix combustion mode to the diffusion combustion mode, and this corresponds to FIGS. 4A and 4B. This flow starts when a shift request from the premix combustion mode to the diffusion combustion mode is received based on the detection result by the accelerator position sensor 56. First, at Step S71, the oxygen concentration within the cylinder 2 is estimated based on, for example, the detection value of O₂ sensor 53 (i.e., the detection result of the oxygen concentration within the exhaust passage 26, and the ECU 40 determines whether a current oxygen concentration within the cylinder 2 exceeds the tolerance limit of soot. If it does not exceed the tolerance limit of soot (YES), the ECU 40 proceeds to Step S72, where the normal control is executed. This normal control sets the shift course from the premix combustion mode to the diffusion combustion mode, and gradually changes the fuel injection mode (i.e., the combustion injection pattern, the injection timing, and the injection amount) along the shift course, while gradually changing the oxygen concentration within the cylinder 2 through the control of the EGR valves 35 and 45 and the VVM 72 (here, the EGR amount is reduced and the oxygen concentration is increased). Thereby, as shown by L11 on the map of FIG. 4A, the state shifts to P13, and, a state shifts to P23, P24 and P22 as shown by L21, L22, and L23 on the map of FIG. 4B.

At the subsequent Step S77, the ECU 40 determines whether the shift of the combustion mode is completed, and if the shift is completed (YES), the flow is ended. On the other hand, if the shift is not completed (NO), the flow returns to Step S71. Therefore, even during the execution of the normal control, if the state within the cylinder 2 changes to the state exceeding the tolerance limit of soot, the ECU 40 stops the normal control and proceeds to Step S73.

At Step S71, if the ECU 40 determines that the oxygen concentration exceeds the tolerance limit of soot, the ECU 40 proceeds to Step S73, where the diffusion retard mode is executed. That is, at the subsequent Step S74, the ECU 40 sets a retard amount of the diffusion combustion fuel injection based on the tolerance limit and the misfire limit of soot. That is, the ECU 40 sets the third timing which avoids the tolerance limit of soot described above, and, based on the third timing, it executes the pre-stage injection, the main injection, and the post-stage injection. Thereby, on the map of FIG. 4A, the state shifts as shown by L12 and reaches P14.

After that, according to the change in the oxygen concentration within the cylinder 2, the ECU 40 advances, within the range which does not exceed the tolerance limit of soot, the fuel injection timing toward the second timing which is the injection timing in the diffusion combustion mode (see Step S75), and continues the advance of the injection timing until the shift of the combustion mode is completed (see Step S76). Thereby, on the map of FIG. 4A, the state shifts as shown by L13.

Then, when the timing of the diffusion combustion fuel injection turns into the injection timing in the diffusion combustion mode and the shift of the combustion mode is completed (in other words, the determination at Step S76 is YES), the flow is ended.

FIG. 8 shows the shift control from the diffusion combustion mode to the premix combustion mode, and this corresponds to FIGS. 5A and 5B. This flow starts when a shift request from the diffusion combustion mode to the premix combustion mode is received based on the detection result by the accelerator position sensor 56.

First, at Step S81, the ECU 40 determines, based on the oxygen concentration within the cylinder 2 which is estimated, for example, based on the detection value of O₂ sensor 53, whether the tolerance limit of NVH can be avoided in the current state when changed to the fuel injection mode in the premix combustion mode. At this step, the ECU 40 may also determine whether both the tolerance limit of NVH and the tolerance limit of NOx can be avoided also taking the tolerance limit of NOx into consideration. If the determination at Step S81 is YES, the ECU 40 proceeds to Step S82, where the normal control is executed. This normal control sets the shift course from the diffusion combustion mode to the premix combustion mode, and gradually changes the fuel injection mode (i.e., the combustion injection pattern, the injection timing, and the injection amount) along the shift course, while gradually changing the oxygen concentration within the cylinder 2 through the control of the EGR valves 35 and 45 and the VVM 72 (here, the EGR amount is increased and the oxygen concentration is reduced). Thereby, on the map of FIG. 4B, the state shifts to P43 and P42 as shown by L41 and L42.

At the subsequent Step S85, the ECU 40 determines whether the shift of the combustion mode is completed, and if the shift is completed (YES), the flow is ended. On the other hand, if the shift is not completed (NO), the flow returns to Step S81.

If the ECU 40 determines that the oxygen concentration will exceed the tolerance limit of NVH at Step S81 (NO), the ECU 40 proceeds to Step S83, where the diffusion retard mode is executed. That is, at the subsequent Step S84, the ECU 40 sets a retard amount of the timing of the diffusion combustion fuel injection based on the tolerance limit and the misfire limit of soot. Specifically, the ECU 40 sets the third timing which avoids the tolerance limit of soot described above, while executing the pre-stage injection, the main injection, and the post-stage injection based on the third timing. Thereby, on the map of FIG. 5A, the state shifts as shown by L31 and L32, and reaches P33 and P34. Note that, even if the third timing is not retarded later than the second timing, the retard amount may be set to 0 (zero) when the tolerance limit of soot can be avoided.

Then, at Step S84, the ECU 40 waits for the oxygen concentration within the cylinder 2 being changed while the third timing is retarded in order to avoid the tolerance limit of soot. Then, the state where the tolerance limit of NVH can be avoided is obtained by the determination at Step S81, the ECU 40 proceeds to Step S82, where the diffusion retard mode is switched to the normal control. Associated with this, the fuel injection pattern is switched to the premix combustion pattern, and the injection timing is also jumped (advanced) to the first timing. That is, on the map of FIG. 5A, the state shifts as shown by L33 and reaches P35.

After that, by continuing the normal control until the shift is completed, the state shifts as shown by L34 on the map of FIG. 5A, and when the oxygen concentration changes into the predetermined state and the shift is completed, the flow is ended.

Thus, in the above diesel engine A, when shifting from the premix combustion mode to the diffusion combustion mode with the increase in the load of the engine body 1, the fuel injection pattern is switched from the premix combustion pattern to the diffusion combustion pattern and, after that, the timing of the fuel injection is set to the third timing which is later than the second timing which is the injection timing in the diffusion combustion mode. Thereby, the ECU 40 waits for the change in the oxygen concentration within the cylinder 2 in the state where the problems of NVH and exhaust emission are avoided, and, by changing the fuel injection timing from the third timing toward the second timing according to the change in the oxygen concentration, it becomes possible to complete the shift of the combustion mode.

On the contrary, when shifting from the diffusion combustion mode to the premix combustion mode with the decrease in the load of the engine body 1, the fuel injection pattern remains in the diffusion combustion pattern, but the timing of the fuel injection is set to the third timing which is later than the second timing in the diffusion combustion mode. Thereby, similarly to the above, the ECU 40 waits for the change in the oxygen concentration within the cylinder 2 in the state where the problems of NVH and exhaust emission are avoided, and when the oxygen concentration is changed to the state where it can be switched to the premix combustion mode, the fuel injection pattern is switched to the premix combustion pattern and, by changing (jumping) the fuel injection timing from the third timing to the first timing in the premix combustion mode, it becomes possible to complete the shift of the combustion mode.

Such a diffusion retard mode makes it possible to shift the combustion mode without exceeding the tolerance limit of NVH or exhaust emission, upon the shift of the combustion mode, when the fuel injection mode and the oxygen concentration within the cylinder 2 are continuously changed, even when NVH or exhaust emission inevitably exceeds the tolerance limit.

On the other hand, since the above diffusion retard mode is disadvantageous in the fuel consumption, as described above, upon the shift of the combustion mode, when the fuel injection mode and the oxygen concentration within the cylinder 2 are continuously changed, the diffusion retard mode is executed only when NVH or exhaust emission inevitably exceeds the tolerance limit, and, other than this, the mode is inhibited (i.e., the normal control is executed), thereby contributing to an improvement of the fuel consumption (also see the white arrow in FIG. 3).

Embodiment 2

Figure 9:
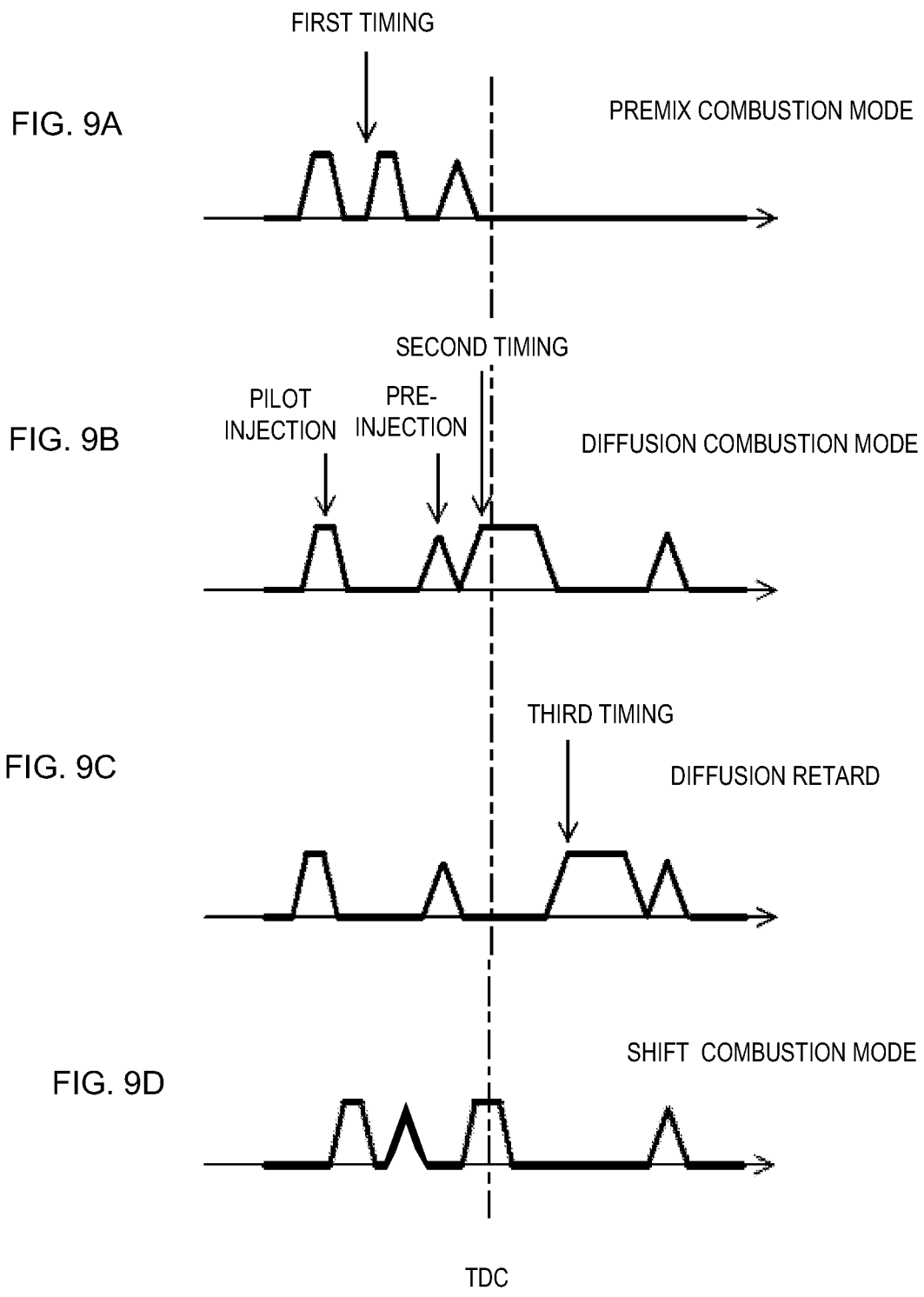
FIG. 9 shows graphs showing examples of the fuel injection mode according to a second embodiment, where the part (a) shows an example of the fuel injection mode in the premix combustion mode, the part (b) shows an example of the fuel injection mode in the diffusion combustion mode, the part (c) shows an example of the fuel injection mode in the diffusion retard mode, and the part (d) shows an example of the fuel injection mode in the shift combustion mode.

FIG. 9 shows an example of the fuel injection mode in each of the combustion modes according to a second embodiment. In this embodiment, when switching the combustion mode mutually between the premix combustion mode and the diffusion combustion mode (including the diffusion retard mode), a shift combustion mode is executed. This shift combustion mode is a mode for avoiding or reducing the sense of incongruity of the person on board resulting from the sudden change in the quality of combustion sound when switching the combustion mode.

First, in the fuel injection mode of the premix combustion mode shown in FIG. 9A, fuel injections are carried out three times into the cylinder 2 at an early timing during the compression stroke like the fuel injection mode shown in FIG. 6A. Thereby, the injected fuel combusts by self-ignition at or near a top dead center of the compression stroke in a state where the fuel is fully mixed with air. Here, the timing near the second fuel injection of the three fuel injections is defined as a fuel injection timing in the premix combustion mode (i.e., a first timing).

Next, in the fuel injection mode of the diffusion combustion mode shown in FIG. 9B, two pre-stage injections are carried out prior to the main injection at or near a top dead center of the compression stroke, slightly dissimilar to the fuel injection mode shown in FIG. 6B. The first pre-stage injection of the two pre-stage injections is a pilot injection executed at a timing comparatively separated from the main injection, and this pilot injection increases the pre-mixing ability of the fuel, while improving the air utilization rate. On the other hand, the next pre-stage injection is a pre-injection executed at a timing comparatively close to the main injection. By combining with the pilot injection, the pre-injection causes pre-combustion before the main combustion, and creates a state within the cylinder 2 where the fuel is easy ignited. This shortens an ignition delay of the fuel injected by the execution of the main injection, slows the main combustion, and avoids or suppresses the sudden rise in the heat release rate. That is, the two or more pre-stage injections become advantageous in a reduction of the combustion noise.

Moreover, the fuel injection mode of the diffusion combustion mode shown in FIG. 9B includes a post-stage injection executed after the main injection. This post-stage injection is executed with a predetermined time interval from the main injection, slightly dissimilar to the post-stage injection in the fuel injection mode shown in FIG. 6B. Such a post-stage injection suppresses a temperature drop within the cylinder 2 during the expansion stroke after a peak of the heat release rate of the main combustion, and holds the temperature within the cylinder 2 at a high temperature. This is advantageous in reducing the discharge of soot by stimulating oxidization of the soot generated in an initial stage and in an intermediate stage of combustion while utilizing air outside the cavity. The fuel injection timing of the fuel injection mode in the diffusion combustion mode (i.e., the second timing) is defined as a timing of the main injection at or near a top dead center of the compression stroke.

Next, in the fuel injection mode of the diffusion retard mode shown in FIG. 9C, as compared with the fuel injection mode of the diffusion fuel mode shown in FIG. 9B, only the timing of the main injection is retarded, and the timings of the pilot injection, the pre-injection, and the post-stage injection are set to substantially the same timings as the fuel injection mode of the diffusion fuel mode, respectively. This maintains the occurrence of the pre-combustion before the main combustion by the pilot injection and the pre-injection and the oxidization effect of soot by the post-stage injection, the same as described above, and achieves the avoidance of the tolerance limits of NVH and exhaust emission littered by the retard of the main injection when shifting mutually between the premix combustion mode and the diffusion combustion mode. The fuel injection timing in the diffusion retard mode is defined by the retarded timing of the main injection (i.e., the third timing), and this third timing is changed according to the change in the oxygen concentration within the cylinder 2 as described above.

The shift combustion mode shown in FIG. 9D includes the total of four times of the fuel injections, which are a fuel injection executed near the first timing which is the fuel injection timing in the premix combustion mode shown in FIG. 9A, a fuel injection executed near the second timing which is the fuel injection timing in the diffusion combustion mode shown in FIG. 9B, a fuel injection before the injection executed near the second timing, and a fuel injection executed near the timing of the post-stage injection. In other words, in this fuel injection mode, the intervals of three fuel injections during the compression stroke contained in the fuel injection mode of the premix combustion mode are extended, respectively, and the intervals are made closer to the fuel injection mode of the diffusion combustion mode in which four fuel injections are performed.

Figure 10:
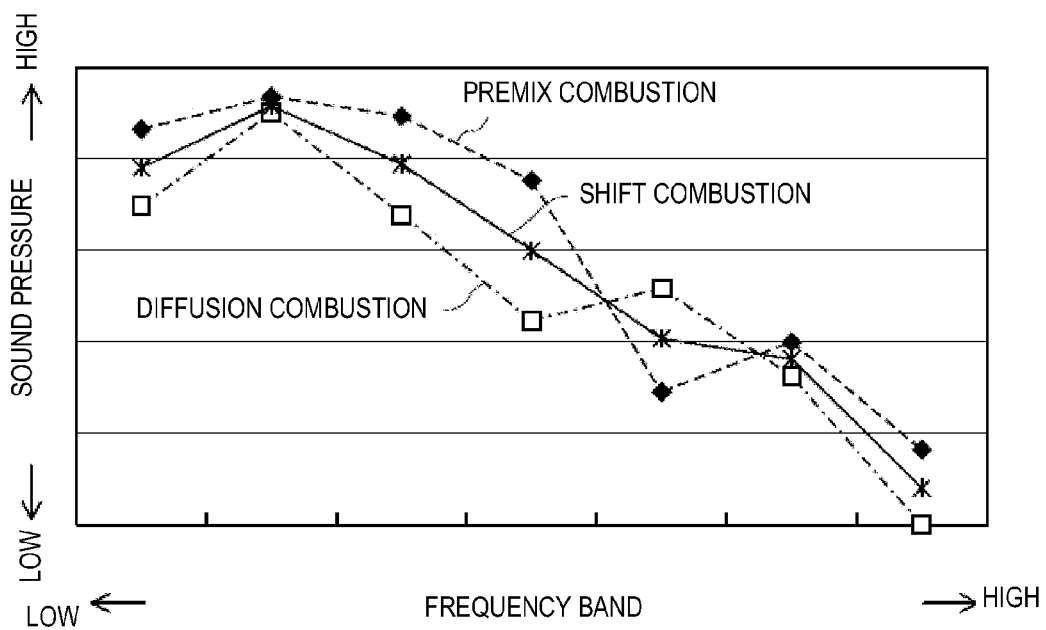
FIG. 10 shows graphs showing a relation between a frequency band and a sound pressure of combustion sound, for premix combustion, diffusion combustion, and shift combustion, respectively.

Here, in FIG. 10, the characteristics of the combustion sound of the premix combustion, the diffusion combustion, and the shift combustion are compared, where the horizontal axis in this chart indicates a frequency band and the vertical axis indicates a sound pressure. According to this chart, as shown by the dashed line in FIG. 10, the combustion sound of the premix combustion has a characteristic in which the sound pressure is higher within a comparatively low frequency band than the combustion sound of the diffusion combustion (see a chain line in FIG. 10), and is lower within a comparatively higher frequency band than the combustion sound of the diffusion combustion. The difference of the characteristics of the combustion sound (the difference of the sound quality) causes the sudden change in the quality of combustion sound when switching the combustion mode.

On the other hand, the shift combustion includes, as described above, both the fuel injection executed near the first timing corresponding to the fuel injection timing in the premix combustion mode, and the fuel injection executed near the second timing corresponding to the fuel injection timing in the diffusion combustion mode. In this example, the shift combustion also includes the fuel injection executed near the timing of the post-stage injection in the diffusion combustion mode. Thereby, as shown by a solid line in FIG. 10, the characteristic of the combustion sound of the shift combustion has an intermediate characteristic of the premix combustion and the diffusion combustion. That is, the sound pressure of the combustion sound of the shift combustion is located between the premix combustion and the diffusion combustion within a large frequency band from the low frequency band to the high frequency band.

For this reason, the execution of the shift combustion mode prior to the shift from the premix combustion mode to the diffusion combustion mode and the shift from the diffusion combustion mode to the premix combustion mode avoids that the quality of combustion sound changes suddenly.

Figure 11:
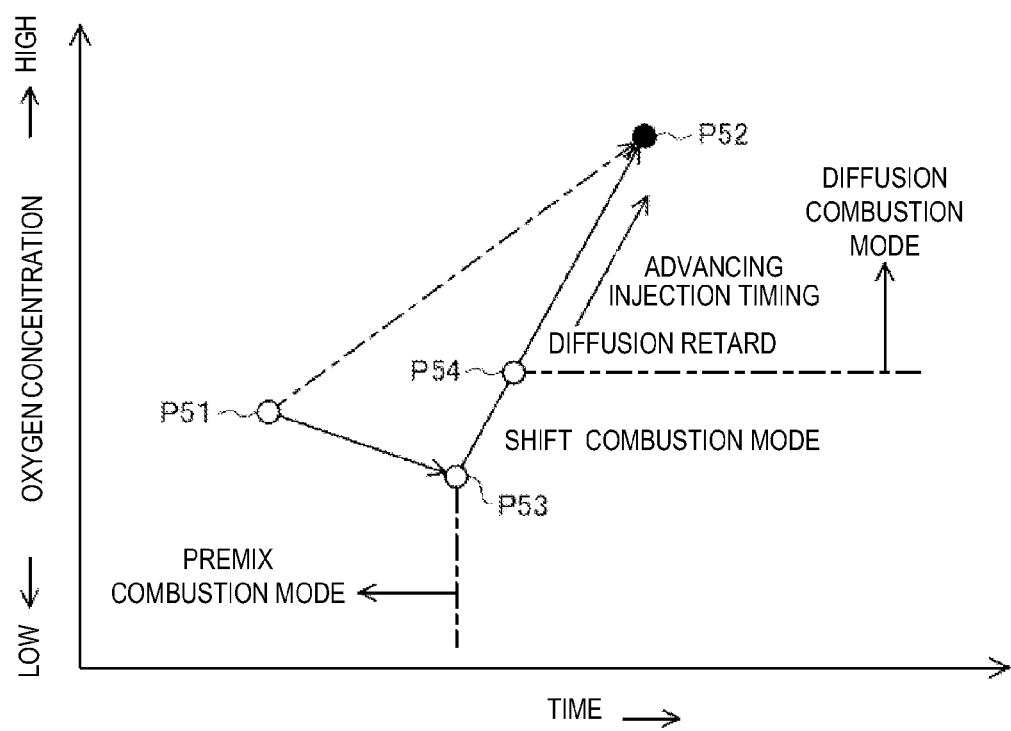
FIG. 11 is a graph showing an example of a change in the oxygen concentration when shifting from the premix combustion mode to the diffusion combustion mode, and switching between the premix combustion mode, the shift combustion mode, the diffusion combustion mode corresponding to the change in the oxygen concentration in the second embodiment.

FIG. 11 is a graph illustrating a transition of the premix combustion mode, the diffusion combustion mode, and the shift combustion mode, where the horizontal axes indicates time and the vertical axis indicates the oxygen concentration within the cylinder 2. Here, a case where the state shifts from a state in the premix combustion mode shown by P51 in FIG. 11 to a state in the diffusion combustion mode shown by P52 with an increase of the engine load associated with a depression of the accelerator pedal is described as an example. This example shows an example where the diffusion retard mode is executed because the difference of the oxygen concentrations within the cylinder 2 is large before and after the shift.

First, in the state of the premix combustion mode of P51, as shown in FIG. 9A, three fuel injections are executed during a compression stroke, and PCI combustion is performed. Therefore, when the fuel injection amount increases associated with a depression of the accelerator pedal, the oxygen concentration within the cylinder 2 is reduced temporarily. That is, the oxygen concentration within the cylinder 2 does not simply increase from P51 to P52 as shown by the chain line in FIG. 11, but, as shown by the solid line in the same graph, the oxygen concentration falls once and then increases gradually. The premix combustion mode is continued as it is from the state of P51 to P53 where the oxygen concentration becomes the lowest. Then, the EGR control which is behind the depressing operation of the accelerator pedal begins to follow and, after that, the oxygen concentration within the cylinder 2 increases gradually. At this time, the shift combustion mode described above is executed from the state of P53 by the time the oxygen concentration becomes slightly higher than the initial oxygen concentration as shown by P54 (see FIG. 9D). The sudden change of the quality of combustion sound is avoided by executing the shift combustion mode before shifting to the diffusion combustion mode.

Then, when the oxygen concentration within the cylinder 2 becomes in the state shown by P54, the mode shifts to the diffusion combustion mode. In this case, it will be in the diffusion retard mode immediately after the shift. That is, as shown in FIG. 9C, only the timing of the main injection is retarded. Thereby, the avoidance of the tolerance limits of NVH and exhaust emission is achieved as described above.

Then, the timing of the main injection is gradually advanced as the oxygen concentration within the cylinder 2 increases. Then, the main injection becomes at the predetermined timing as shown in FIG. 9B, and the shift of the combustion mode is completed as the oxygen concentration within the cylinder 2 reaches the state of P52.

Figure 12A:
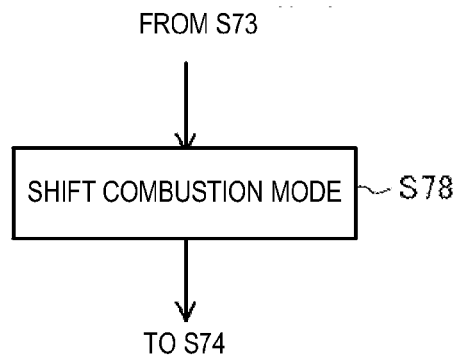
FIGS. 12A and 12B are additional steps of the flowchart of the shift control from the premix combustion mode to the diffusion combustion mode shown in FIG. 7, according to the second embodiment.
Figure 12B:
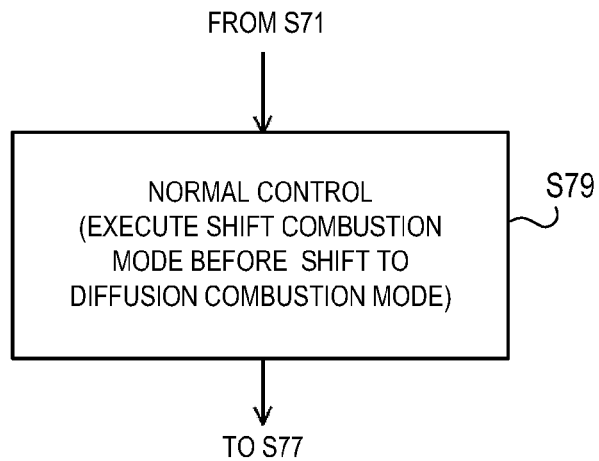

As shown in FIG. 12A, the control flow executed by the ECU 40 when shifting from the premix combustion mode to the diffusion combustion mode is combined with Step S78 where the shift combustion mode is executed between Step S73 and Step S74 in the flowchart of FIG. 7. Moreover, as shown in FIG. 12B, Step S72 in the flowchart of FIG. 7 is replaced with Step S79. Although Step S79 is substantially the same as the step of normal control at Step S72, but it is added with the execution of the shift combustion mode described above before the shift to the diffusion combustion mode.

Note that, between FIG. 4A and FIG. 11, P11 and P51, P12 and P52, P14 and P54 correspond to each other, respectively, and P53 corresponds to the part from P11 to P13.

Figure 13:
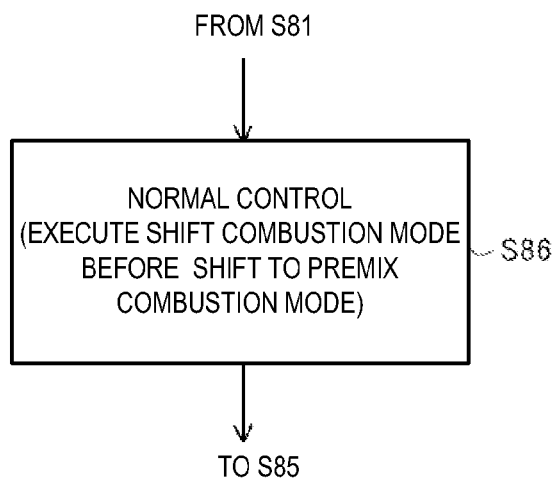
FIG. 13 is an additional step of the flowchart of the shift control from the diffusion combustion mode to the premix combustion mode shown in FIG. 8, according to the second embodiment.

On the other hand, when shifting from the diffusion combustion mode to the premix combustion mode, in the control flow executed by the ECU 40, Step S82 in the flowchart of FIG. 8 is replaced with Step S86, as shown in FIG. 13. Although Step S86 is substantially the same as the step of the normal control at Step S82, it is added with the execution of the shift combustion mode described above before the shift to the premix combustion mode.

In this way, by interposing the shift combustion mode in the shift from the premix combustion mode to the diffusion combustion mode and the shift from the diffusion combustion mode to the premix combustion mode, respectively, the sudden change of the quality of combustion sound is avoided and it is possible to avoid or reduce the sense of incongruity to be given to the person on board.

Note that the fuel injection mode of the respective combustion modes shown in FIGS. 6A to 6C and the fuel injection mode of the respective combustion modes shown in FIGS. 9A to 9D are interchangeable.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An automobile-mount diesel engine, comprising:
an engine body being mounted in an automobile, supplied with fuel mainly containing diesel fuel, and for selectively operating in a premix combustion mode for a low load or in a diffusion combustion mode for a high load;
an injection control module for controlling an injection of the fuel into a cylinder through a fuel injection valve according to a combustion mode; and
an EGR amount control module for adjusting an EGR gas amount into the cylinder;
wherein, when the engine body operates in the premix combustion mode, the injection control module executes a fuel injection of a premix combustion pattern containing one or more injections at a first timing where a pressure within the cylinder is relatively low, and when the engine body operates in the diffusion combustion mode, the injection control module executes a fuel injection of a diffusion combustion pattern containing one or more injections at a second timing that is later than the first timing;
wherein the EGR amount control module executes a control for introducing an amount of EGR gas into the cylinder according to an operating condition of the engine body, at least in the premix combustion mode and when shifting from the premix combustion mode to the diffusion combustion mode;
wherein, when shifting from the premix combustion mode to the diffusion combustion mode with an increase in a load of the engine body, the injection control module also switches a fuel injection pattern from the premix combustion pattern to the diffusion combustion pattern and executes the fuel injection of the diffusion combustion pattern at a third timing that is later than the second timing and, after that, the injection control module executes a transition control in which the third timing is changed toward the second timing according to a change in an oxygen concentration within the cylinder;
wherein the injection control module executes the transition control when shifting to the diffusion combustion mode from a state where the load of the engine body is high, that is a state where the oxygen concentration within the cylinder is below a predetermined value in the premix combustion mode; and
wherein the injection control module inhibits the transition control when shifting to the diffusion combustion mode from a state where the load of the engine body is low, that is a state where the oxygen concentration within the cylinder is higher than the predetermined value in the premix combustion mode.

2. The automobile-mount diesel engine of claim 1, wherein the injection control module executes a set of fuel injections at least containing a fuel injection at or near the first timing and a fuel injection at or near the second timing, before switching from the premix combustion pattern to the diffusion combustion pattern.

3. The automobile-mount diesel engine of claim 1, wherein the third timing is set between a tolerance limit of soot and a misfire limit so that atomized fuel injected during an expansion stroke reaches in a cavity recessed in a top of a piston within the cylinder.

4. The automobile-mount diesel engine of claim 3, wherein the diffusion combustion pattern includes a main injection and two or more pre-stage injections executed before the main injection.

5. The automobile-mount diesel engine of claim 4, wherein an injection time interval between the pre-stage injections and the main injection is shorter than an injection time interval of the pre-stage injections.

6. The automobile-mount diesel engine of claim 1, wherein the diffusion combustion pattern includes a main injection and a post-stage injection that is executed after a predetermined time interval after the main injection; and
wherein the fuel injection for diffusion combustion that is set to the third timing is set so that, with respect to the fuel injection for the diffusion combustion that is set to the second timing, the post-stage injection remains at a same timing and only timing of the main injection is delayed.

7. The automobile-mount diesel engine of claim 1, wherein the EGR amount control module adjusts an internal EGR gas amount by controlling at least one of operations of an intake valve and an exhaust valve of the engine body.

8. An automobile-mount diesel engine, comprising:
an engine body being mounted in an automobile, supplied with fuel mainly containing diesel fuel, and for selectively operating in a premix combustion mode for a low load or in a diffusion combustion mode for a high load;
an injection control module for controlling an injection of the fuel into a cylinder through a fuel injection valve according to the combustion mode; and
an EGR amount control module for adjusting an EGR gas amount into the cylinder;
wherein, when the engine body operates in the premix combustion mode, the injection control module executes a fuel injection of a premix combustion pattern containing one or more injections at a first timing where a pressure within the cylinder is relatively low, and when the engine body operates in the diffusion combustion mode, the injection control module executes a fuel injection of a diffusion combustion pattern containing one or more injections at a second timing that is later than the first timing;

wherein the EGR amount control module executes a control for introducing an amount of EGR gas into the cylinder according to an operating condition of the engine body, at least in the premix combustion mode and when shifting from the diffusion combustion mode to the premix combustion mode; and wherein the injection control module executes, when shifting from the diffusion combustion mode to the premix combustion mode with a decrease in a load of the engine body, a fuel injection of the diffusion combustion pattern at a third timing that is later than the second timing and, after an oxygen concentration within the cylinder turns into a predetermined concentration, the injection control module executes a transition control in which a fuel injection pattern is switched from the diffusion combustion pattern to the premix combustion pattern and the fuel injection of the premix combustion pattern is executed at the first timing;

wherein the injection control module executes the transition control when shifting from the diffusion combustion mode to a state where the load of the engine body is high, that is a state where the oxygen concentration within the cylinder is below a predetermined value in the premix combustion mode; and wherein the injection control module inhibits the transition control when shifting from the diffusion combustion mode to a state where the load of the engine body is low, that is a state where the oxygen concentration within the cylinder is higher than the predetermined value in the premix combustion mode.

9. The automobile-mount diesel engine of claim 8, wherein the injection control module executes a set of fuel injections at least containing a fuel injection at or near the first timing and a fuel injection at or near the second timing before switching from the diffusion combustion pattern to the premix combustion pattern.

10. The automobile-mount diesel engine of claim 8, wherein the third timing is set between a tolerance limit of soot and a misfire limit so that atomized fuel injected during an expansion stroke reaches in a cavity recessed in a top of a piston within the cylinder.

11. The automobile-mount diesel engine of claim 10, wherein the diffusion combustion pattern includes a main injection and two or more pre-stage injections executed before the main injection.

12. The automobile-mount diesel engine of claim 8, wherein the diffusion combustion pattern includes a main injection and a post-stage injection that is executed after a predetermined time interval after the main injection; and wherein the fuel injection for the diffusion combustion that is set to the third timing is set so that, with respect to the fuel injection for the diffusion combustion that is set to the second timing, the post-stage injection remains at a same timing and only timing of the main injection is delayed.

13. The automobile-mount diesel engine of claim 8, wherein the EGR amount control module adjusts an internal EGR gas amount by controlling at least one of operations of an intake valve and an exhaust valve of the engine body.

14. A method of controlling an automobile-mount diesel engine, mounted in an automobile and supplied with fuel mainly containing diesel fuel, comprising:

executing a fuel injection of a premix combustion pattern containing one or more injections at a first timing, while introducing an amount of EGR gas according to an operating condition of the engine into a cylinder, when a load of the engine is low, to operate the engine in a premix combustion mode;

executing a fuel injection of a diffusion combustion pattern containing one or more injections at a second timing that is later than the first timing, when the load of the engine is high, to operate the engine in a diffusion combustion mode;

switching a fuel injection pattern from the premix combustion mode to the diffusion combustion mode, while introducing the amount of EGR gas according to the operating condition of the engine into the cylinder, when shifting from the premix combustion pattern to the diffusion combustion pattern with an increase in the load of the engine;

setting the fuel injection timing to a third timing that is later than the second timing, immediately after switching to the diffusion combustion pattern; and after that, changing the third timing toward the second timing according to a change in oxygen concentration within the cylinder;

wherein a transition control is executed when shifting to the diffusion combustion mode from a state where the load of the engine body is high, that is a state where the oxygen concentration within the cylinder is below a predetermined value in the premix combustion mode; and wherein the transition control is inhibited when shifting to the diffusion combustion mode from a state where the load of the engine body is low, that is a state where the oxygen concentration within the cylinder is higher than the predetermined value in the premix combustion mode.

15. A method of controlling an automobile-mount diesel engine, mounted in an automobile and supplied with fuel mainly containing diesel fuel, comprising:

executing a fuel injection of a premix combustion pattern containing one or more injections at a first timing, while introducing an amount of EGR gas according to an operating condition of the engine into a cylinder, when a load of the engine is low, to operate the engine in a premix combustion mode;

executing a fuel injection of a diffusion combustion pattern containing one or more injections at a second timing that is later than the first timing, when the load of the engine is high, to operate the engine in a diffusion combustion mode;

executing a fuel injection of the diffusion combustion pattern at a third timing that is later than the second timing, while introducing the amount of EGR gas according to the operating condition of the engine into the cylinder, when shifting from the diffusion combustion mode to the premix combustion mode with a decrease in the load of the engine; and switching a fuel injection pattern from the diffusion combustion pattern to the premix combustion pattern after an oxygen concentration within the cylinder turns into a predetermined concentration, to execute the fuel injection at the first timing;

wherein a transition control is executed when shifting from the diffusion combustion mode to a state where the load of the engine body is high, that is a state where the oxygen concentration within the cylinder is below a predetermined value in the premix combustion mode; and wherein the transition control is inhibited when shifting from the diffusion combustion mode to a state where the load of the engine body is low, that is a state where the oxygen concentration within the cylinder is higher than the predetermined value in the premix combustion mode.

* * * * *